US009032025B2

(12) United States Patent
Vieira

(10) Patent No.: US 9,032,025 B2
(45) Date of Patent: May 12, 2015

(54) SYSTEM AND METHOD FOR MANAGING DATA USING TREE STRUCTURES

(75) Inventor: Elvis Melo Vieira, Kanata (CA)

(73) Assignee: Blackberry Limited, Waterloo, Ontario (CA)

(*) Notice: Subject to any disclaimer, the term of this patent is extended or adjusted under 35 U.S.C. 154(b) by 238 days.

(21) Appl. No.: 13/634,444

(22) PCT Filed: Mar. 16, 2012

(86) PCT No.: PCT/CA2012/050167
§ 371 (c)(1),
(2), (4) Date: Nov. 16, 2012

(87) PCT Pub. No.: WO2013/134847
PCT Pub. Date: Sep. 19, 2013

(65) Prior Publication Data
US 2013/0246527 A1    Sep. 19, 2013

(51) Int. Cl.
*G06F 15/16* (2006.01)
*H04L 29/08* (2006.01)
*G06F 17/30* (2006.01)

(52) U.S. Cl.
CPC .......... *H04L 67/104* (2013.01); *H04L 67/1089* (2013.01); *G06F 17/30581* (2013.01); *G06F 17/30961* (2013.01)

(58) Field of Classification Search
CPC .............. G06F 17/30206; G06F 17/30174; G06F 17/30581; G06F 17/30873; G06F 17/30949; H04L 67/104; H04W 56/00
USPC .......... 709/204, 248, 219; 707/770, 614, 622
See application file for complete search history.

(56) References Cited

U.S. PATENT DOCUMENTS

| 8,001,077 | B2 | 8/2011 | Kelley et al. | |
| 2005/0187946 | A1* | 8/2005 | Zhang et al. | 707/100 |
| 2006/0194589 | A1 | 8/2006 | Sankisa | |
| 2008/0104277 | A1* | 5/2008 | Tian | 709/248 |
| 2008/0287058 | A1 | 11/2008 | Nahm et al. | |
| 2009/0182730 | A1 | 7/2009 | Krishnamoorthy et al. | |
| 2009/0271412 | A1* | 10/2009 | Lacapra et al. | 707/10 |
| 2010/0106687 | A1 | 4/2010 | Marcy et al. | |

(Continued)

OTHER PUBLICATIONS

Chan, Alan; International Search Report from corresponding PCT Application No. PCT/CA2012/050167; search completed on Nov. 28, 2012.

*Primary Examiner* — Wing F Chan
*Assistant Examiner* — Benjamin M Thieu
(74) *Attorney, Agent, or Firm* — Jon Gibbons; Fleit Gibbons Gutman Bongini & Bianco P.L.

(57) ABSTRACT

A distributed tree protocol is provided for managing computing devices that form a peer-to-peer overlay network, and for modifying data that is synchronized between the devices. A method for modifying the data includes representing data in a tree structure. The tree structure includes at least one tree node identified by a tree node ID, the tree node ID including a numerical value representing a path from a root node to the at least one node. The root node and the tree structure are identified by a root node ID. The device can send or receive a peer-to-peer message with an other computing device. The message includes a format value specifying a format of the numerical value, the root node ID, an operation value specifying modification of the data, and at least one tree node ID associated with the modification of the data.

16 Claims, 18 Drawing Sheets

(56) References Cited

U.S. PATENT DOCUMENTS

| | | |
|---|---|---|
| 2010/0110935 A1 | 5/2010 | Tamassia et al. |
| 2011/0099611 A1 | 4/2011 | Ji et al. |
| 2011/0219137 A1 | 9/2011 | Yang et al. |
| 2012/0226776 A1* | 9/2012 | Keebler et al. ............... 709/217 |

* cited by examiner

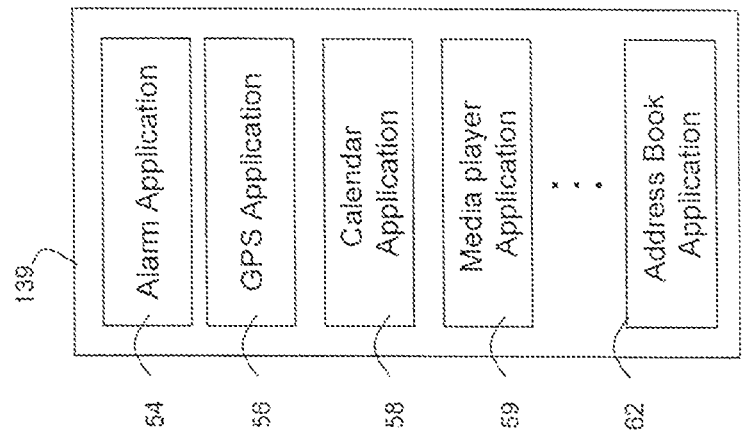
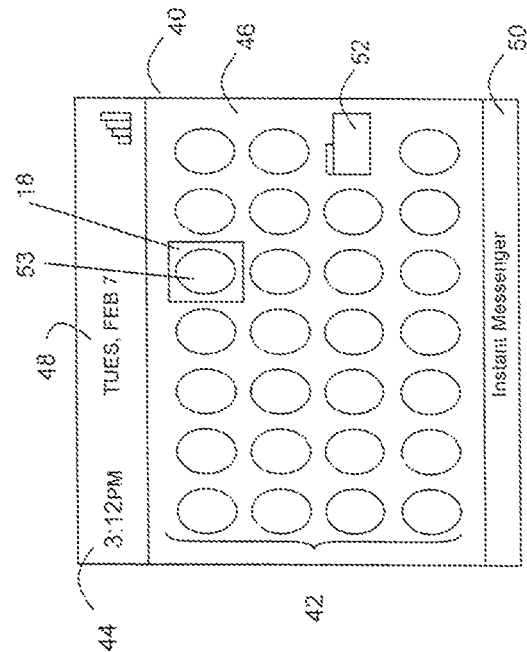

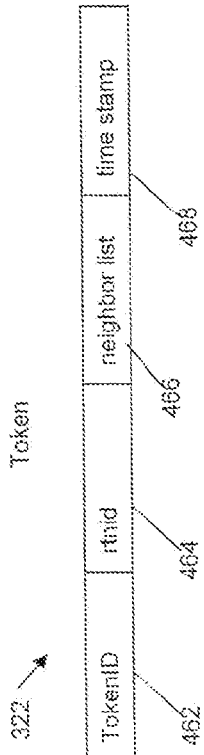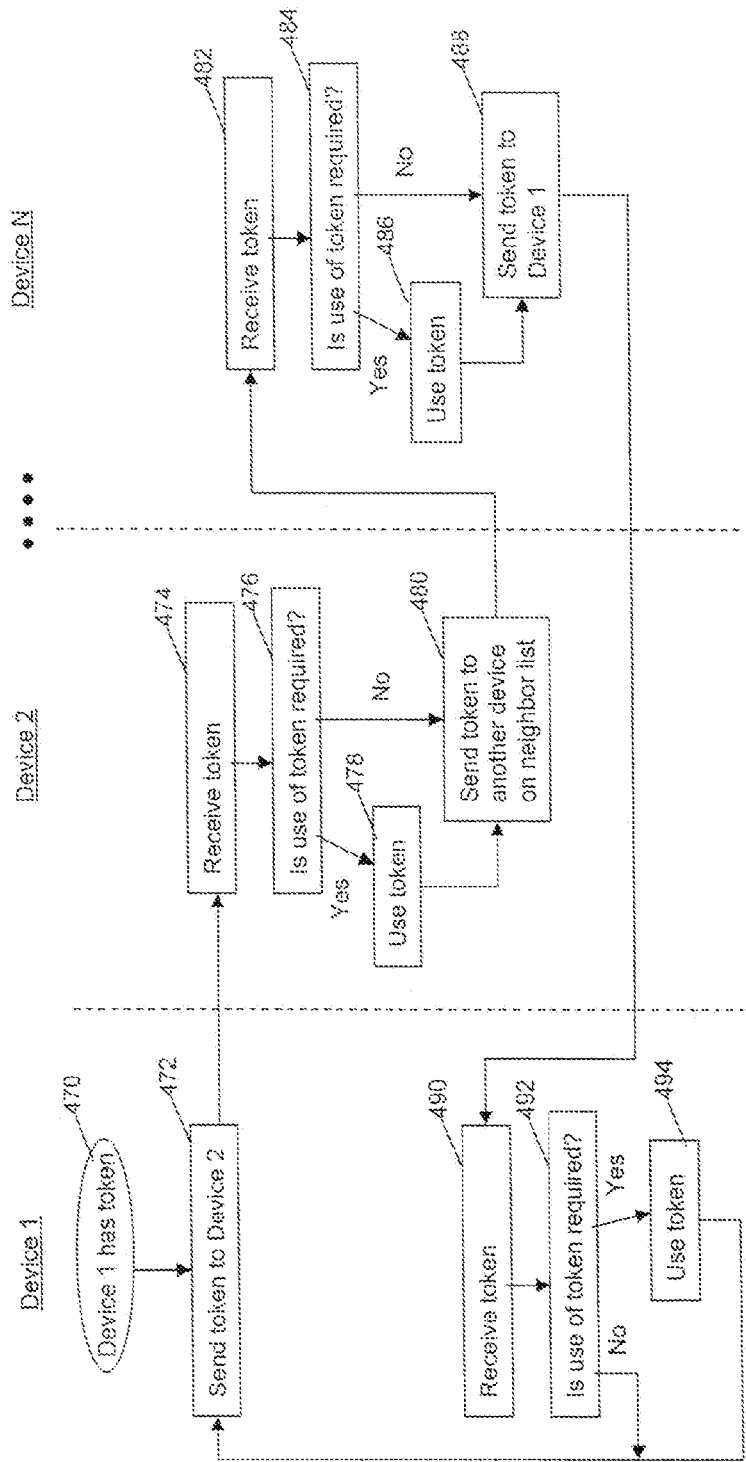

US 9,032,025 B2

SYSTEM AND METHOD FOR MANAGING DATA USING TREE STRUCTURES

TECHNICAL FIELD

The following relates generally to managing data using tree structures.

DESCRIPTION OF THE RELATED ART

Computing devices, including mobile devices and personal computers, are very common. A user may have multiple computing devices, such as, for example, a desktop computer, a tablet and a smart phone. A user typically uses each of the computing devices at different times. The user can enter different data into each of the devices at different times. For example, a user adds data into one computing device. The user may then wish to synchronize the added data across all the other computing devices.

BRIEF DESCRIPTION OF THE DRAWINGS

Example embodiments will now be described by way of example only with reference to the appended drawings wherein:

FIG. 8 is a screen shot of a home screen displayed by the mobile device, according to an example embodiment.

FIG. 9 is a block diagram illustrating an example embodiment of the other software applications and components shown in FIG. 7.

FIG. 20 is a block diagram illustrating an example embodiment of a token.

FIG. 21 is a flow diagram of example embodiment computer executable or processor implemented instructions for transmitting the token amongst an overlay network.

DETAILED DESCRIPTION

Figure 1:
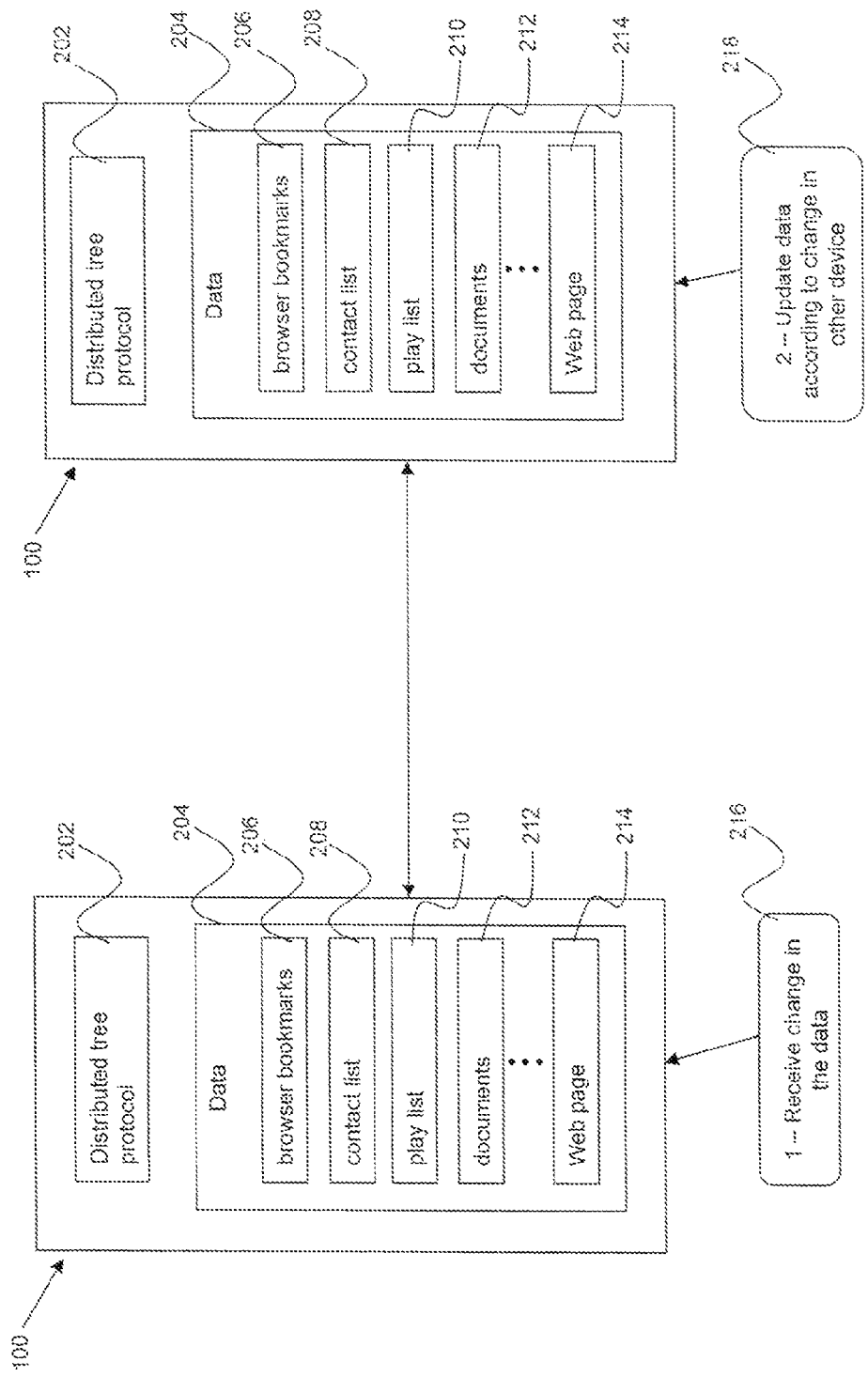
FIG. 1 is a schematic diagram of an example embodiment system for synchronizing data between two computing devices.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A user may have multiple computing devices, such as, for example, a desktop computer, a tablet and a smart phone. A user wishes to have the information, or portions of the information, on each computing device to be synchronized. For example, although information is added to one device, the added information is updated across the user's other devices. In this way, data across the different devices is consistent.

Data synchronization is useful in various scenarios. For example, a user discovers a website using a smart phone and bookmarks the website. When the user moves to a desktop computer to view the website, the user typically needs to re-enter in the website address. In another example, a user makes a shopping list on a tablet. Typically, to be able to view the shopping list on a smart phone, the user needs to email the list to himself/herself and download the shopping list on to the mobile device, or needs to re-enter in the shopping list on the phone. A synchronization process can be used as an alternative in the above scenarios.

Data synchronization can be performed using servers, such as a web server. For example, a copy of current information is centrally stored on a server and distributed to, or accessed by, client computing devices. As one computing device makes a modification to the information, the modified information is also stored on the server so that other computing devices can access or use the modified information. However, a server can cause a delay in communication between client devices. Using a server to manage and coordinate synchronization of data also causes increased data transfer and bandwidth usage, since data must always pass through the server. Using a server to store and synchronize data also provides a mode of failure. For example, if the server is shut down or fails, then devices connected to the server can no longer by synchronized. Companies or users may also desire to keep information confidential, and would not prefer to have their information stored on a server.

The proposed systems and methods include a computing device in peer-to-peer (P2P) communication with another computing device, and the computing devices are configured to synchronize their data using a tree protocol. This does not require a server to be used to store the data.

By way of background, P2P computing or networking is a distributed application architecture that partitions tasks or workloads among peers. Peers are equally privileged, equipotent participants in the application. They are said to form a peer-to-peer network of nodes. P2P systems often implement an abstract overlay network, built at Application Layer, on top of the native or physical network topology. Such overlays are used for indexing and peer discovery and make the P2P system independent from the physical network topology. Content is typically exchanged directly over a communication network, for example, an Internet Protocol (IP) network. A P2P overlay network includes all the participating peers as network nodes. There are links between any two nodes that know each other. For example, if a participating peer knows the location of another peer in the P2P network, then there is a directed edge from the former node to the latter in the overlay network. Based on how the nodes in the overlay network are linked to each other, the P2P networks can be classified as unstructured or structured.

Non-limiting examples of the communication modes used for a P2P network include WiFi, Bluetooth™, and cell phone communications.

A computing device herein refers to a mobile device, a desktop computer, a personal digital assistant, a smart phone, a tablet, an e-reader, etc.

A computing device is considered a "physical node" in a P2P communication network.

It can be appreciated that using a P2P communication network reduces delays in communication, reduces bandwidth usage, and increases security since data is transferred between devices. It also increases the robustness of the network. For example, should one of the devices in the P2P network fail, other devices in the P2P network can continue to provide data updates amongst themselves.

Turning to FIG. 1, two computing devices 100 are shown in P2P communication with each other. Both computing devices 100 have computer executable or processor implemented instructions for performing a distributed tree protocol 202. The devices 100 also include data 204 which is structured or organized according to the distributed tree protocol. Non-limiting examples of such data include browser bookmarks 206, a contact list 208, a play list 210, documents 212, and a web page 214.

The data 204 on both devices 100 are synchronized, such that they are consistent with each other. For example, a first device 100 receives a change or modification in the data 216. This change is then distributed to the second device 100, according to the distributed tree protocol, such that the second device 100 updates the data according to the change made in the first device 218.

Figure 2:
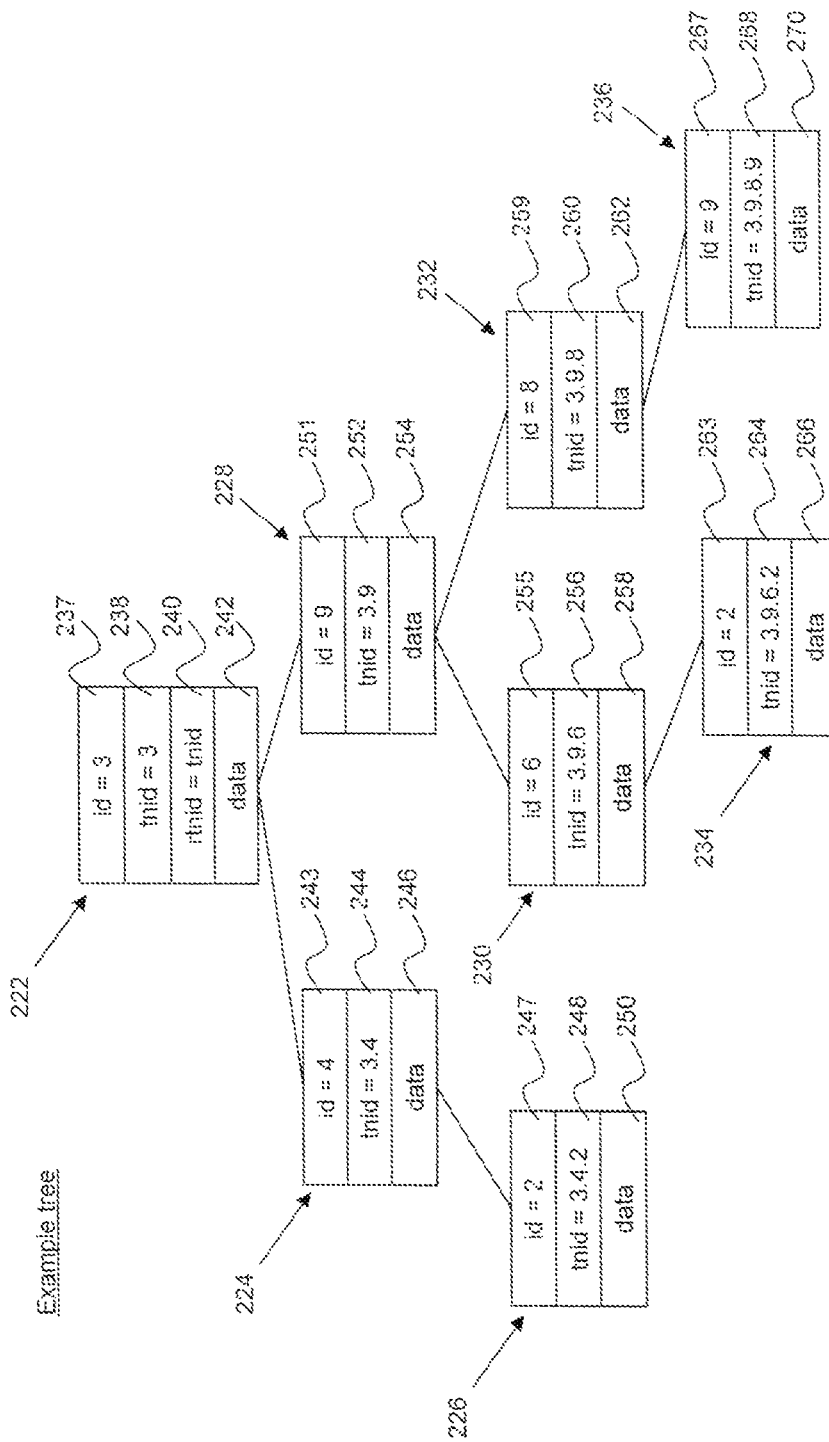
FIG. 2 is a block diagram of an example embodiment tree.

Turning to FIG. 2, an example data tree structure, or tree, is shown. It includes a root node 222, from which other nodes 224, 228, 226, 230, 232, 234, 236 branch out directly or indirectly. The term "node" refers to a structure which contains a value, a condition, or represents a separate data structure (which could be a tree of its own). Each node in a tree has zero or more child nodes, which are below it in the tree. A node that has a child is called the child's parent node (or ancestor node, or superior). A node has at most one parent. The root node 222 does not have a parent node.

In an example embodiment, a node in a tree is considered to be atomic. Update messages will remove or add the whole information of the node. Pieces of the information in a node cannot be added or deleted, but rather the entire node is added or deleted.

In another example embodiment, the information in a node can be modified while maintaining the node.

Each of the nodes, including the root node, is associated with an ID having an unsigned integer. The unsigned integers at each node can be used to form a tree node ID (herein referred to as "tnid"). For example, the root node 222 is associated with an ID 237 of the value "3". The tree node ID, or tnid, 238 is represented as "3".

The tree is identified by a root node ID 240. In an example embodiment, the root node ID is equal to the tree node ID of the root node. Therefore, in the example of FIG. 2, the root node ID (herein referred as "rtnid") is equal to the value "3". The root node 222 can also include data 242.

A child node 224 of the root node 222 has an ID 243 of the value "4". Its tnid 244 is equal to "3.4". It also associated with data 246. A child node 226 of the node 224 has an ID 247 of the value "2". Its tnid 248 is equal to "3.4.2" and it has data 250.

As can be seen, in an example embodiment, the identification of a tree node (e.g. the tnid) can be in the format of a materialized path. A materialized path is a representation of the path from the root node to a certain node in the tree. In this way, a node in the tree can be easily located. For example, the tnid "3.4.2" means that the certain node 226 is a child of node 224, which is a child of the root node 222.

Other examples of using a materialized path to identify a tree node are shown in FIG. 2. The node 228 has an ID 251 of "9", a tnid 252 equal to "3.9", and is associated with data 254. The node 230 has an ID 255 of "6", a tnid 256 equal to "3.9.6", and is associated with data 258. The node 234 has an ID 263 of "2", a tnid 264 equal to "3.9.6.2", and is associated with data 266. The node 232 has an ID 259 of "8", a tnid 260 equal to "3.9.8", and is associated with data 262. The node 236 has an ID 267 of "9", a tnid 268 equal to "3.9.8.9", and is associated with data 270.

In an example embodiment, the materialized paths can be encoded by a sequence of bytes. For example, the materialized path 3.9.6.2 of node 234 can be encoded, using 4 byte integers, as a sequence of 17 bytes: 0x1103000000090000000600000002.

In another example embodiment, the tree node ID is expressed as a rational number. The rational number is represented by the expression (a/b), such that a≥b≥1 and GCD (a,b)=1. A tree node ID in the materialized path format can be converted to a rational number using a continued fraction method. For example, the materialized path 3.9.6.2 of node 234 is converted using the process:

$$3 + \cfrac{1}{9 + \cfrac{1}{6 + \cfrac{1}{2}}} = \frac{370}{119}$$

Therefore, a=370 and b=119. The tnid of node 234 as expressed in the format of a rational number is 370/119.

As another example, the tnid of node 224 as expressed in the format of a rational number is 13/4.

In an example embodiment, a rational number can be expressed as a first four byte group representing the numerator a, and a second four byte group representing the denominator b. For example, in total, the rational number is expressed as a 8 bytes.

A tnid as expressed in the format of a rational number can be converted to a materialized path format using a Euclidean algorithm. For example, the rational number 370/119 can be processed according to:

370=119×3+13

119=13×9+2

13=6×2+1

6=1×6+0

In this way, the materialized path 3.9.2.6 can be obtained from the rational number.

In some scenarios, it is preferred to represent the tnids as rational numbers since only two integers are required. If the tree has a great height, (e.g. many layers), then the materialized format may use a higher number of bytes to represent the materialized path. A rational format can maintain a shorter number bytes to represent the two integers. In this way, the tree node ID is efficiently represented with a rational number, which also indicates the tree node's location in a tree. The computing devices in the network are configured to compute the materialized path from the rational number, and compute the rational number from a materialized path.

In an example embodiment, data is represented in a tree structure. The tree structure includes at least one tree node identified by a tree node ID. The tree node ID is a numerical value representing a path from a root node to the at least one node, the root node and the tree structure identified by a root node ID. The format of the numerical value is a materialized path or it is a rational number of a form a/b, where a>b>1 and GCD (a,b)=1. By identifying a node using such a numerical value, a computing device can quickly also identify the node's location within a tree structure. This makes the distribution and modification of data between different devices more efficient.

Figure 3:
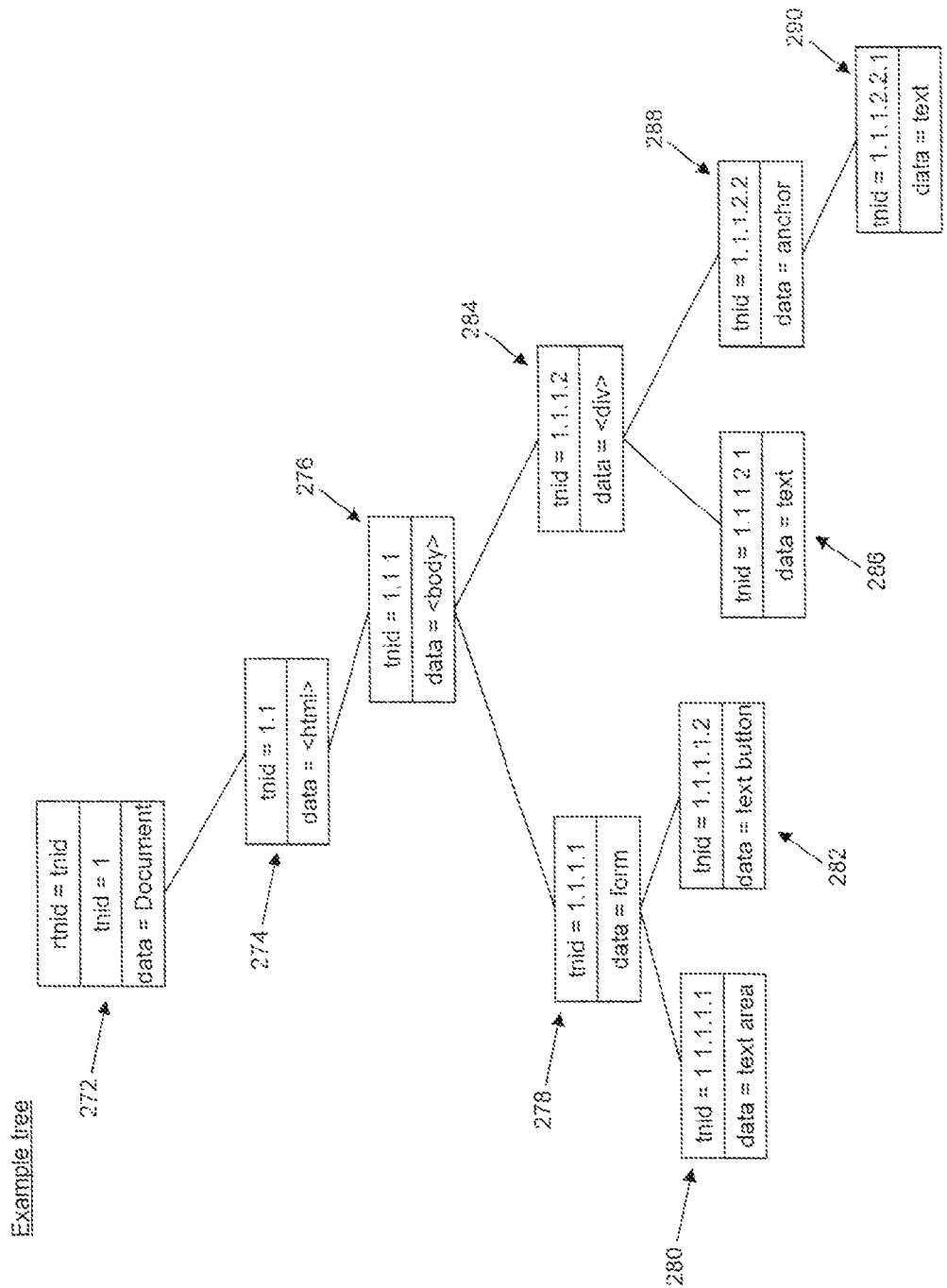
FIG. 3 is a block diagram of another example embodiment tree.

Turning to FIG. 3, another example embodiment tree structure is shown. The example data is organized to suit a web page. Root node 272 includes data identifying a document. Node 274 includes data identifying the header "<html>". Node 276 defines the html tag <body>, used to define the document's body. Node 278 defines a form in the document body. Nodes 280 and 282 define a text area and a text button, respectively, in the form. Node 284 defines a section in the document body. Nodes 286 and 288 define text and an anchor, respectively, within the section. Node 290 defines text within the anchor.

Continuing with FIG. 3, the tnids are also shown with respect to each node. In an example ID numbering scheme, the ID integers associated with each node are numbered consecutively, starting with "1", on each layer of the tree. In other words, each layer of the tree has at least a node having at an ID integer of "1". A second node on the same level of the tree and having the same parent would have an ID integer of "2". This is just an example, and other numbering schemes can be used.

The selection and assignment of ID integers for each node can vary from application to application. In an example embodiment, a rule for selecting integer IDs associated with a subject node includes determining if another child node, stemming from the same parent node, has the same integer ID. If so, then a different ID integer associated with the subject node has to be selected. This ensures that two or more child nodes of the same parent do not have the same integer IDs. In this way, two child nodes of the same parent can be uniquely identified within the tree with a tnid (also referred to as a tree node ID).

It can be appreciated that other types of data, such as bookmarks, play lists, contact lists, documents, etc. can be also represented as tree structures.

Using the materialized path or the rational number as the tnid helps to easily and conveniently identify a node's location within a tree.

It can be appreciated that various mobile devices can be used with the example embodiments described herein. Example embodiments of applicable electronic devices include pagers, tablets, cellular phones, cellular smartphones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the example embodiments described herein are also suitable for other devices, e.g. "non-mobile" devices.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 5:
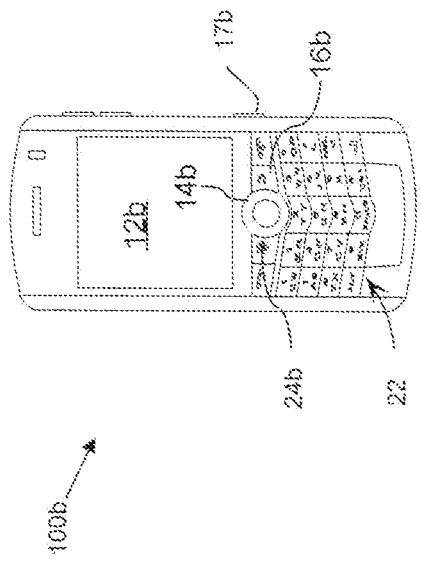
FIG. 5 is a plan view of another example embodiment mobile device.
Figure 4:
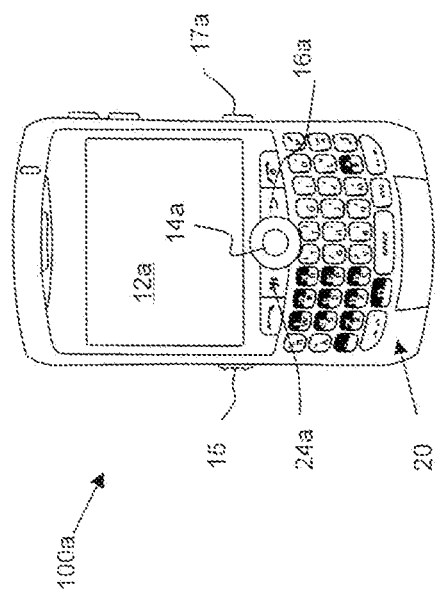
FIG. 4 is a plan view of an example embodiment mobile device.

Referring to FIGS. 4 and 5, an example embodiment of a mobile device 100a is shown in FIG. 4, and another example embodiment of a mobile device 100b is shown in FIG. 5. It will be appreciated that the numeral "100" will hereinafter refer to any mobile device or computing device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 4 includes a display 12a and the cursor or view positioning device 14 shown in this example embodiment is a trackball 14a. Positioning device 14 may serve as another input member and is both rotational to provide selection inputs to the main processor 102 (see FIG. 7) and can also be pressed in a direction generally toward housing to provide another selection input to the processor 102. Trackball 14a permits multi-directional positioning of the selection cursor 18 (see FIG. 8) such that the selection cursor 18 can be moved in an upward direction, in a downward direction, in a leftward direction, in a rightward direction, and if desired and/or permitted, in any diagonal direction. The trackball 14a is in this example situated on the front face of a housing for mobile device 100a as shown in FIG. 4 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100a to provide such a selection input.

The display 12 may include a selection cursor 18 that depicts generally where the next input or selection will be received. The selection cursor 18 may include a box, alteration of an icon or any combination of features that enable the user to identify the currently chosen icon or item. The mobile device 100a in FIG. 4 also includes a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

The mobile device 100b shown in FIG. 5 includes a display 12b and the positioning device 14 in this example embodiment is a trackball 14b. The mobile device 100b also includes a menu or option button 24b, a cancel or escape button 16b, and a camera button 17b. The mobile device 100b as illustrated in FIG. 5, includes a reduced QWERTY keyboard 22. In this example embodiment, the keyboard 22, positioning device 14b, escape button 16b and menu button 24b are disposed on a front face of a mobile device housing. The reduced QWERTY keyboard 22 includes a plurality of multifunctional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 4 and 5 are for illustrative purposes only and various other mobile devices 100 are equally applicable to the following examples. For example, other mobile devices 100 may include the trackball 14b, escape button 16b and menu or option button 24 similar to that shown in FIG. 5 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 6:
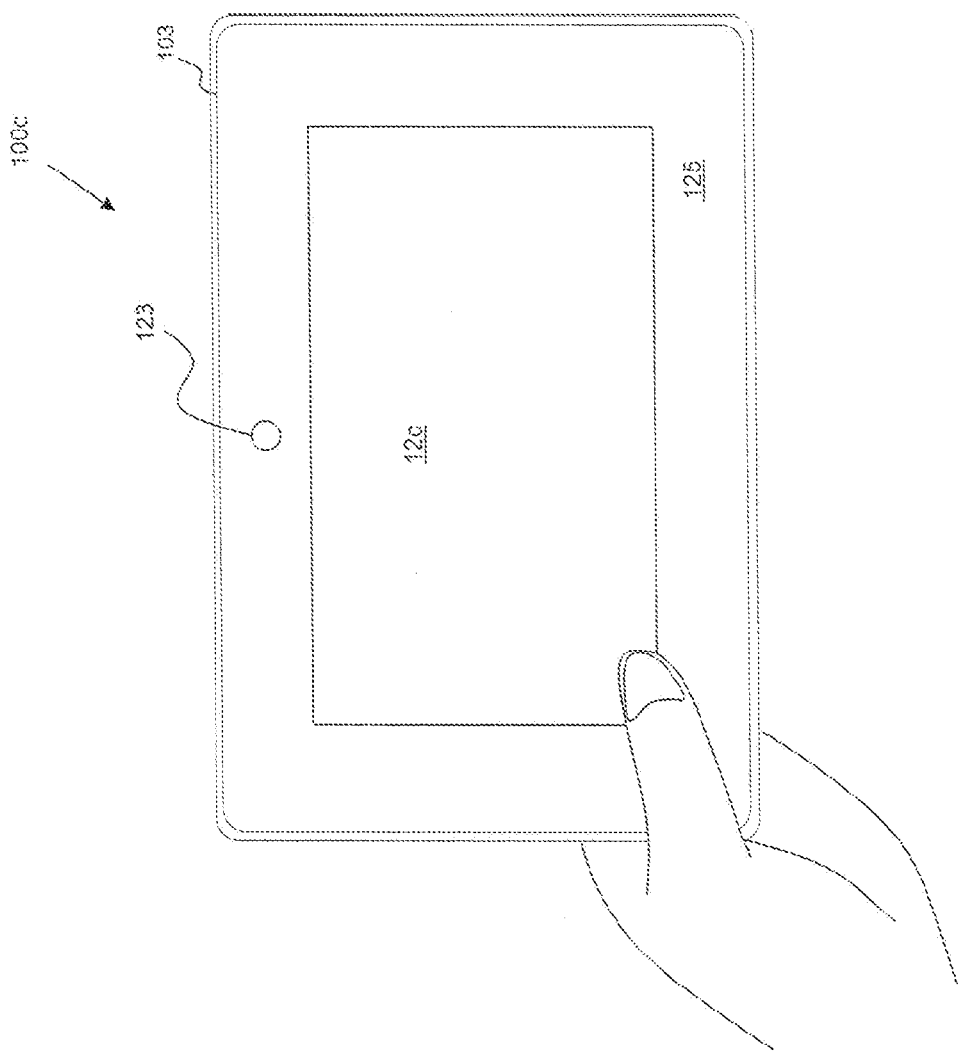
FIG. 6 is a plan view of another example embodiment mobile device.

The mobile device 100c shown in FIG. 6 includes a touch-sensitive display 102 and a front-facing camera 123. The touch-sensitive display 103 includes a touch-sensitive non-display area 125 surrounding a touch-sensitive display area 12c, both of which may be capable of receiving inputs in the form of touching. The display area 12c is also considered, more generally, a display 12. The front-facing camera 123 looks towards the user to capture images or videos of the user or scenes behind the user. Although not shown in the figure, it is appreciated that the mobile device 100c may also have a back-facing camera which looks away from the front of the user to give the user's perspective. The mobile device 100c is considered to be a tablet.

To aid the reader in understanding the structure of the mobile device 100, reference will now be made to FIGS. 7 through 9.

Figure 7:
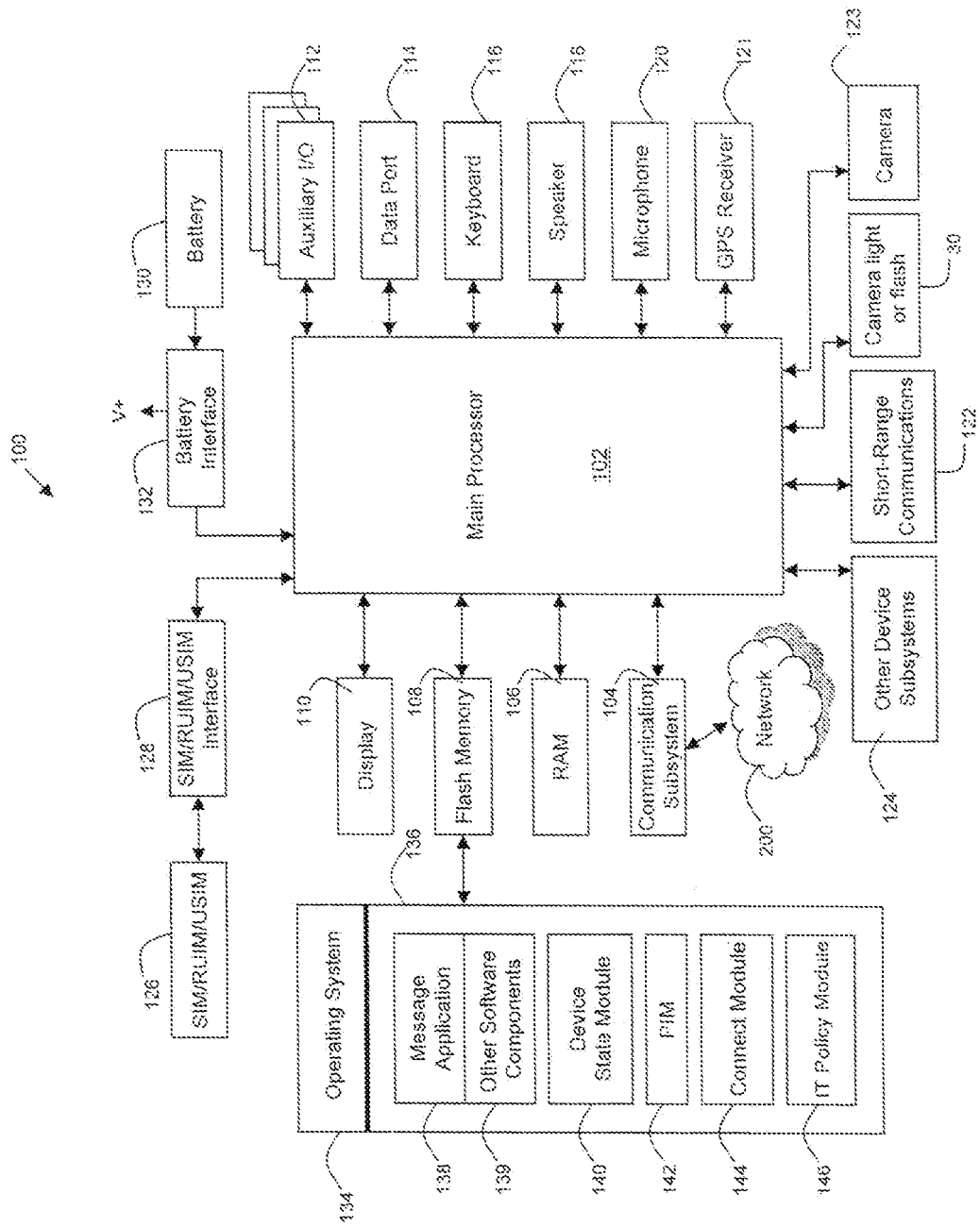
FIG. 7 is a block diagram of an example embodiment of a mobile device.

Referring first to FIG. 7, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max, etc, and WLAN networks such as WiFi. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The mobile device 100 can communicate with the server 208 through the wireless network 200.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a camera light or flash 30, and other device subsystems 124. The display 110 may be touch-sensitive, as is the case in the example embodiment shown in FIG. 6.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100, in an example embodiment, uses a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Once the SIM/RUIM/USIM 126 is inserted into the SIM/RUIM/USIM interface 128, it is coupled to the main processor 102. It can be appreciated that the SiM/RUIM/USIM 126 is not used in some mobile devices 100, such as in tablets and e-readers.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, external camera applications, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Turning now to FIG. 8, the mobile device 100 may display a home screen 40, which can be set as the active screen when the mobile device 100 is powered up and may constitute the main ribbon application. The home screen 40 generally includes a status region 44 and a theme background 46, which provides a graphical background for the display 12. The theme background 46 displays a series of icons 42 in a predefined arrangement on a graphical background. In some themes, the home screen 40 may limit the number of icons 42 shown on the home screen 40 so as to not detract from the theme background 46, particularly where the background 46 is chosen for aesthetic reasons. The theme background 46 shown in FIG. 8 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this example embodiment includes a date/time display 48. The theme background 46, in addition to a graphical background and the series of icons 42, also includes a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 8, and providing a selection input, e.g. by pressing the trackball 14*b*.

FIG. 9 shows an example of the other software applications and components 139 that may be stored and used on the mobile device 100. Only examples are shown in FIG. 9 and such examples are not to be considered exhaustive. In this example, an alarm application 54 may be used to activate an alarm at a time and date determined by the user. A GPS application 56 may be used to determine the location of a mobile device. A calendar application 58 may be used to organize appointments. Another example application is a media player application 59 containing play lists. Another application shown is an address book 62 that is used to store contact information which may include, for example, an email address, a name, and a phone number.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computing device 100 (e.g. mobile device, desktop, etc.), or accessible or connectable thereto. Any application or module herein described may be implemented using computer readable/executable instructions or operations or processor implemented instructions that may be stored or otherwise held by such computer readable media.

Figure 10:
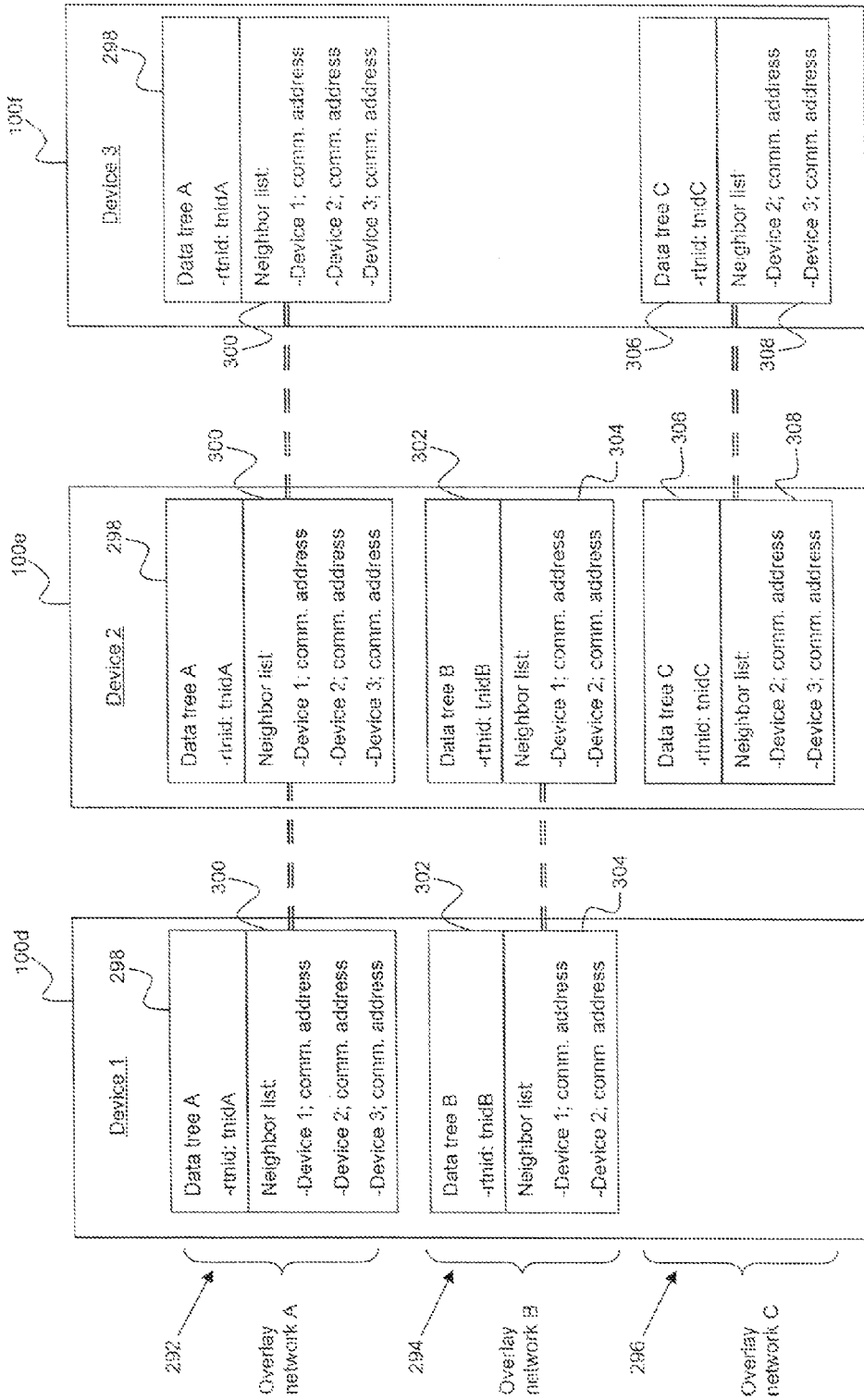
FIG. 10 is a schematic diagram of an example embodiment system of three computing devices forming multiple overlay networks.

Turning to FIG. 10, three computing devices (i.e. device 1 100*d*, device 2 100*e*, and device 3 100*f*) are connected to each other. These devices are considered physical nodes in the P2P network. Overlaid a P2P network are one or more overlay networks for sharing data. An overlay network is defined by a root node ID, or rtnid, which also is used to define a tree. Each device can be considered a physical node to more than one overlay network. For example, an overlay network A 292 includes the physical nodes of the devices 100d, 100e, and 100f. Each of these devices has a copy of the data tree A 298, as identified by the root node ID represented as tnidA. These devices also include a neighbour list 300 which identifies the devices that have stored thereon data tree A. The neighbour list also includes the communication addresses of each of these neighbour devices. A non-limiting example of a communication address is an internet protocol (IP) address. For example, the neighbour list 300 include the identity and communication address of device 1 100d, device 2 100e, and device 3 100f.

An overlay network of devices can also be referred to as a neighbourhood of devices. Devices in the same overlay network are considered as neighbours or neighbour devices.

Similarly, device 1 100d and device 2 100e are the physical nodes of the overlay network B 294, since they both have a copy of the data tree B. The devices 100d and 100e are reflected in the neighbour list 304.

In another example, device 2 100e and device 3 100f are the physical nodes of the overlay network C 296, since they each have a copy of the data tree C. The communication addresses of the devices 100e, 100f are in the associated neighbour list 308.

In an example embodiment, data tree A 298 of the overlay network A 292 is for a web browser bookmark application. Data tree B of the overlay network B 294 is for a play list application. Data tree C of the overlay network C 296 is for a contact list or address book application. It can be appreciated that different overlay networks can be associated with different applications or data groupings.

It can be appreciated that the network topology for the P2P networks can be various. In an example embodiment, all devices (e.g. physical nodes) in the P2P network are connected with each other. This is referred to as a fully connected topology. A full ring topology, amongst other topologies, can be used.

Figure 11:
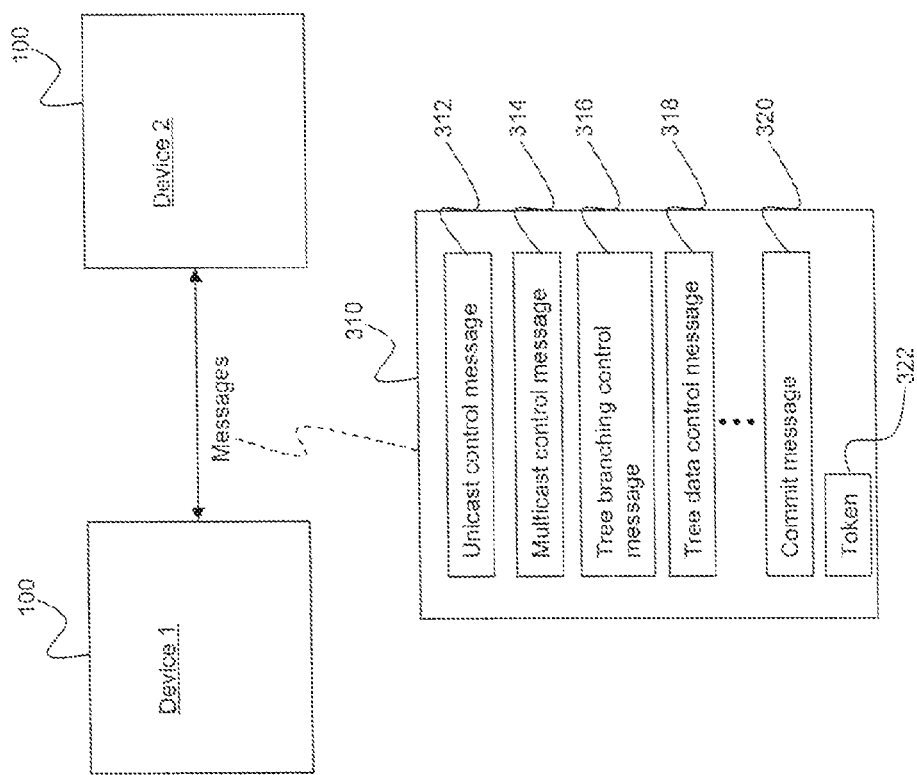
FIG. 11 is a schematic diagram of an example embodiment system of two computing devices exchanging various messages according to a distributed tree protocol.

Turning to FIG. 11, an example embodiment of two computing devices 100 are provided in P2P communication with each other. They exchange a number of messages 310 and data according to a distributed tree protocol to establish, delete, modify, or maintain the structured tree data in each of the devices. Examples of the messages 310 include a unicast control message 312, a multicast control message 314, a tree branching control message 316, a tree data control message 318, a commit message 320, and a token 322.

A unicast control message 312 is sent between devices that have a relationship already established. A multicast message 314 is used to establish a neighbourhood relationship between two or more devices for a determined tree. A tree branching control message 316 allows addition and deletion of tree branches. A tree data control message 318 allows addition and deletion of nodes in a tree. A token 320 defines a lock on a tree, allowing only one device at a time in the overlay network to make changes to the tree. Further detail with respect to these messages and data are described below.

Figure 12:
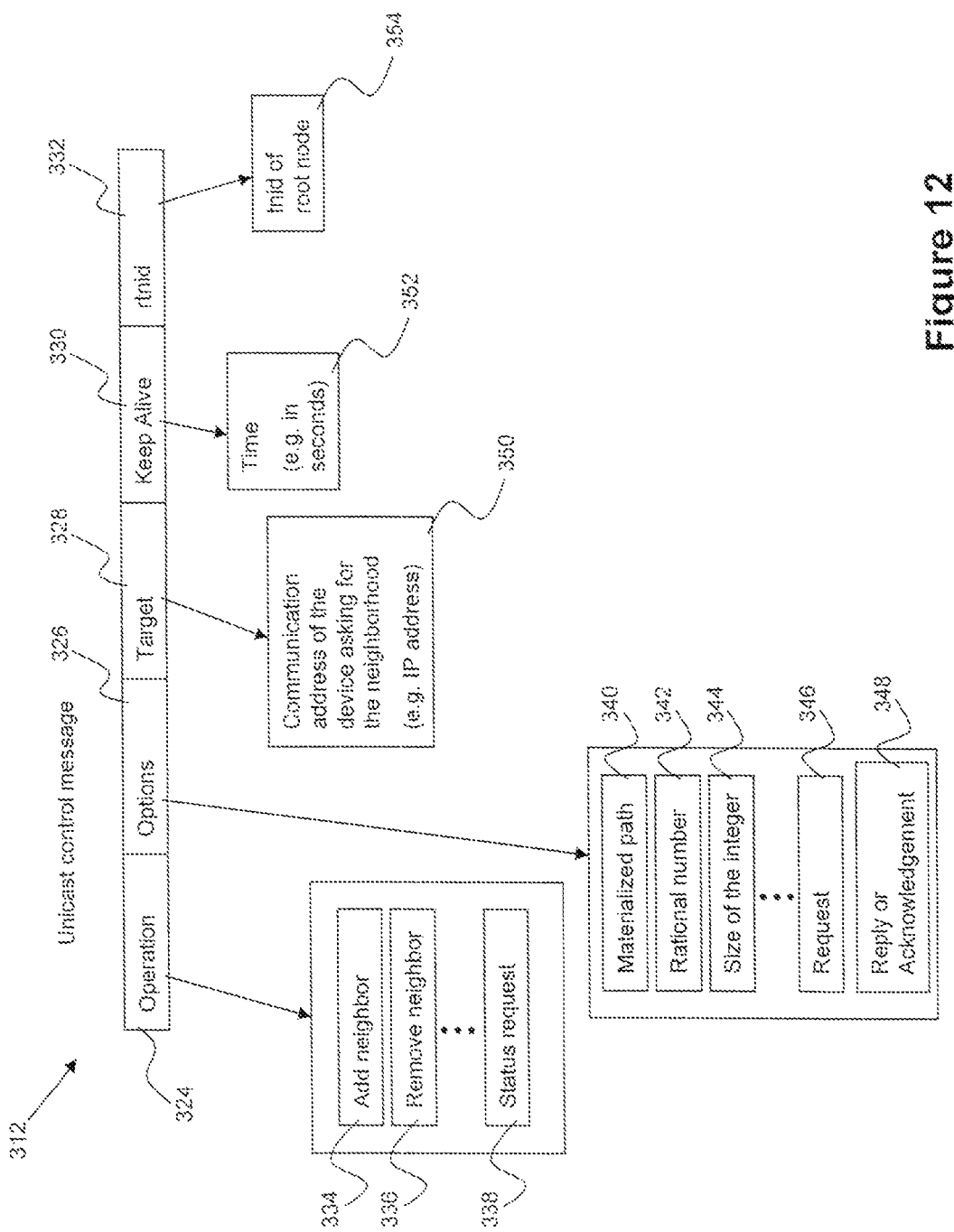
FIG. 12 is a block diagram illustrating an example embodiment of a unicast control message.

Turning to FIG. 12, an example embodiment of a unicast control message 312 is shown, including its components. The unicast control message 312 is used to help control neighbourhood relationships between devices in an overlay network. Components of the message 312 include the following fields: operation 324, option 326, target 328, keep alive 330, and rtnid 332.

In an example embodiment, operation field uses bits 0 to 7, the options field uses bits 8 to 31, the target field uses bits 32 to 63, the keep alive field uses bits 64 to 95, and the rtnid field uses bits 96 and upwards. This, for example, would be suited for the IPv4 network. In another example embodiment that could be used in the IPv6 networks, the operation field uses bits 0 to 7, the options field uses bits 8 to 31, the target field uses bits 32 to 159, the keepalive field uses bits 160 to 191, and the rtnid field uses bits 192 and upwards. It can be appreciated that other bit lengths can be used.

The operation field 324 defines the operation to be performed. Example operations include adding a neighbour 334, removing a neighbour 336, and a status request 338. When a first device sends an add neighbour request using operation 334 to a second device, it is requesting the second device to add the first device as a neighbour to the second device. When a first device sends a remove neighbour request using operation 336 to a second device, it is requesting the second device to remove the first device as a neighbour to the second device. When a first device sends a status request using operation 338 to a second device, it is requesting the second device to send a status of the second device to the first device.

The option field 326 is used to specify the format of the root node ID (e.g. rtnid). For example, the specified format can either be a materialized path form a 340 or a rational number format 342. The options field also specifies the size of the integer used in the tnid or rtnid. The size of the integer can be 8 bits or 4 bits. The option field can also specify the whether the message 312 is a request 346, or a reply 348 or acknowledgement to a request.

In an example embodiment, the first two bits of the options field specify the format of the tnid or rtnid; the third bit indicates the size of the integer; and the remaining bits indicate whether the message is a request or a reply.

The target field 328 identifies the communication address of the device requesting to be added to a neighbourhood, or an overlay network. In an example embodiment, the address is an IP address. In an example embodiment, this information is only required in an add neighbour operation 334.

The keep alive field 330 specifies the time period to maintain or keep a neighbour device in the overlay network, after communication with the neighbour device is lost or disconnected. For example, if the keep alive period is two minutes, and if two neighbour devices are not in communication with each other for at least two minutes, then one of the devices is split from the overlay network. This value is optional, and may not be activated or used. In an example embodiment, it is only used in an add neighbour operation 334.

The rtnid field 332 specifies the tnid of the root node of tree 354. In other words, the rtnid identifies the tree which is distributed across devices in a given overlay network.

Figure 13:
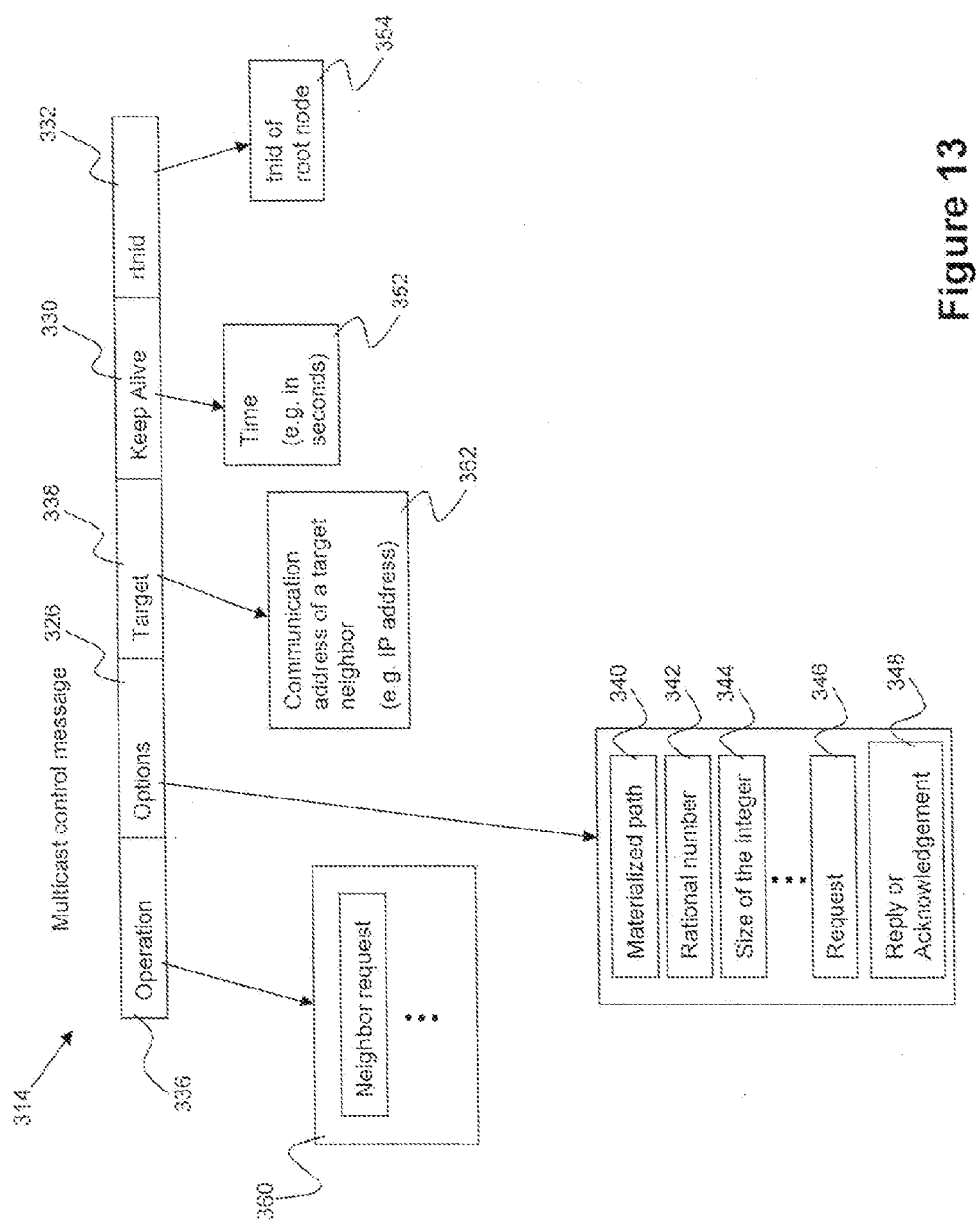
FIG. 13 is a block diagram illustrating an example embodiment of a multicast control message.

Turning to FIG. 13, example components of a multicast control message 314 are shown. These component fields include: an operation field 314, an options field 326, a target field 338, a keep alive field 330, and an rtnid field 332. The multicast control message 314 is similar to the unicast control message 312, although it used where a relationship between devices 100 have not yet been established. Differences of the multicast control message 314 are described below.

The operation field 366 includes a neighbour request operation 360. When a first device sends a multicast control message 314 with operation 360 to a second device, it is announcing itself to the second device. The second device can respond to the first device requesting to establish a neighbourhood relationship. In another example embodiment, the first device sends a multicast message to a group of devices, also called a multicast group, which are associated with a root node ID. In this way, the first device announces itself and its intention to find neighbours. A device, referred to as a second device for convenience of explanation, in the multicast group will send a unicast message with an add neighbour operation to the first device.

The target field 338 specifies the communication address of a target neighbour 362. For example, if a first device sends a message 314 to a second device, the communication address of the second device is specified in the target field. The address, for example, can be an IP address.

Figure 14:
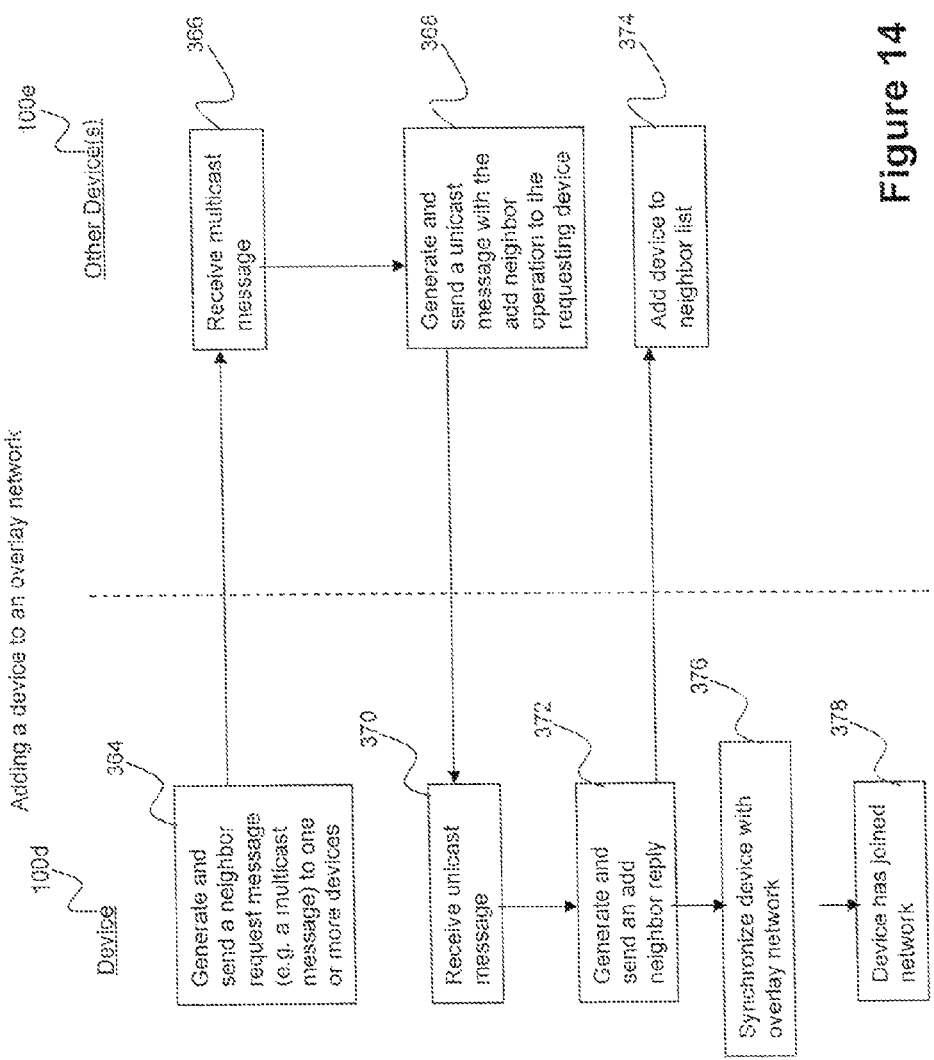
FIG. 14 is a flow diagram of example embodiment computer executable or processor implemented instructions for adding a computing device to an overlay network.

Turning to FIG. 14, an example embodiment of computer executable or processor implemented instructions are provided for adding a device to an overlay network. In this example, a first device 100d is attempting to join an overlay network which includes one or more other devices 100e. The one or more other devices are collectively referred herein as the second device for ease of understanding when explaining this example embodiment. However, it can be appreciated that the first device can communicate with multiple devices.

At block 364, the first device generates and sends a neighbour request message (e.g. a multicast message) to the second device in the existing overlay network. The neighbour request message would include the operation 360 and specify the rtnid identifying the overlay network, amongst other things. At block 366, the second device receives the multicast message. In response, it generates and sends a unicast message with the add neighbour operation to the first device (block 368). The unicast message would include the add neighbour operation 334, the communication address of the first device, and the rtnid of the overlay network, amongst other things. At block 370, the first device receives the unicast message. At block 372, the first device generates and sends an add neighbour reply. This would include the same information as the unicast message it received from the second device, however, it would specify in the options field 326 that the message is a reply 348. After the second device receives the reply, the second device adds the first device to its neighbour list (block 374).

At block 376 the first device is now able to receive other messages from other devices in the overlay network. At this stage, the first device has joined the overlay network (block 378).

In an example embodiment, additional messages can be received from neighbour devices to synchronize itself with the overlay network. The synchronization involves the first device storing a copy of the data tree, as identified by the rtnid, and a copy of the associated neighbourhood list. The copy of the tree data and the neighbourhood list is sent to the first device by the second device over the P2P communications network.

In an example embodiment, only devices that are considered possible neighbours will generate and sends a unicast message reply (block 368) to the first device. In an example embodiment, when a device receives the multicast message 366, it determines if it is geographically located within a certain distance from the first device. This requires the sending of location information. If the devices are located close enough to each other, then the second device is considered a neighbour device. Otherwise, it is not considered a neighbour device and does not send a unicast message reply to the first device. In another example, embodiment, if two more second devices receive the request message from the first device, then the closest of the second devices to the first device is considered a neighbour device and replies according to block 368. In another example embodiment, the two closest, three closest, or "n" closest devices located with respect to the first device are considered neighbour devices.

Figure 15:
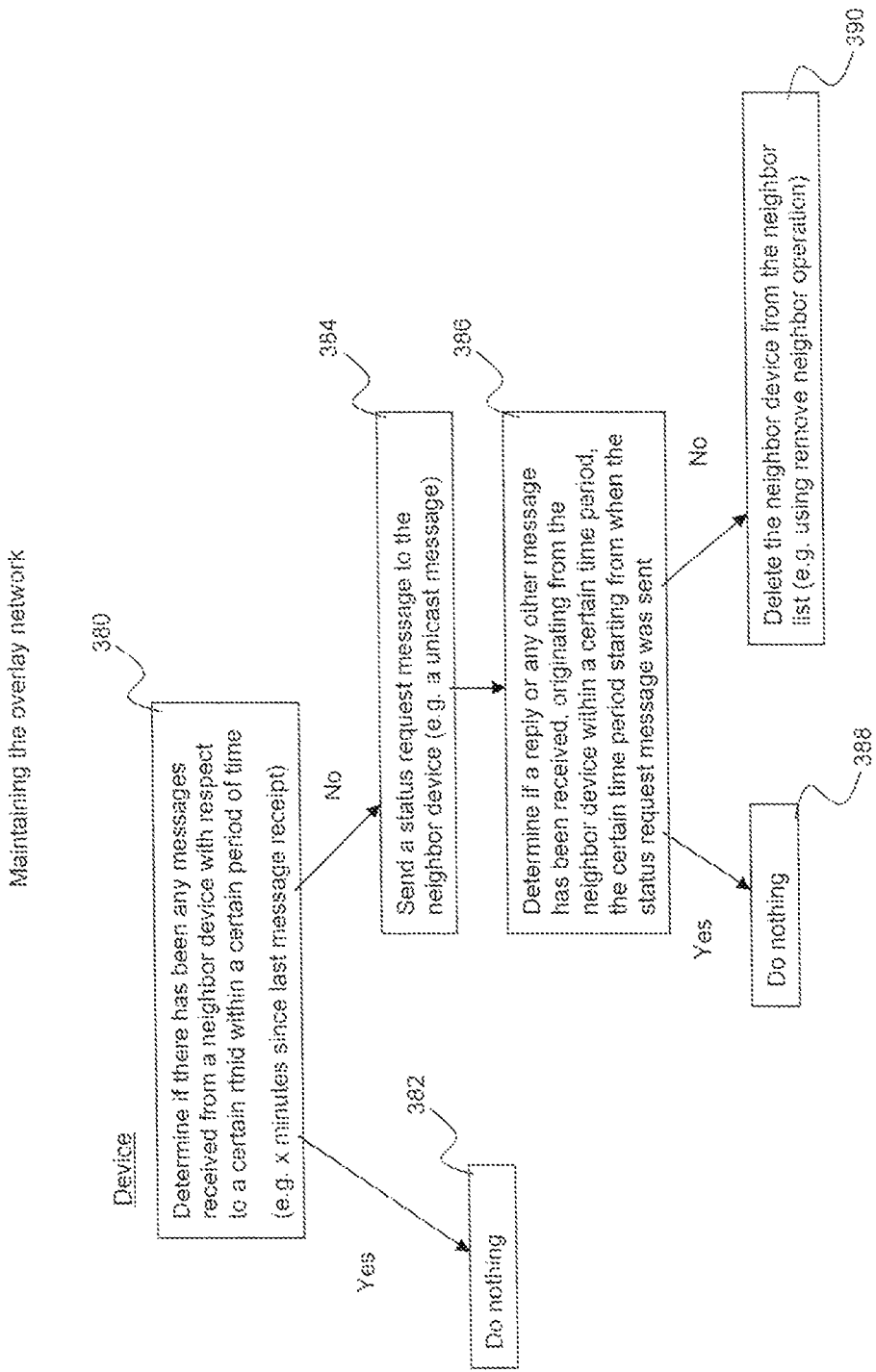
FIG. 15 is a flow diagram of example embodiment computer executable or processor implemented instructions for maintaining an overlay network.

Turning to FIG. 15, an example embodiment of computer executable or processor implemented instructions are provided for maintaining the overlay network. In an example embodiment, a device in an overlay network, which is no longer in communication with another device or other devices in the network, is removed from the network. At block 380, a computing device 100 determines if there has been any messages received from a neighbour device with respect to a certain rtnid, within a certain period of time. This period of time, for example, can be defined as a certain number of minutes since the last message was received from the neighbour device. The time period can be defined by a user, if so, no action is taken by the device (block 382). If no message has been received from the neighbour device within a certain time period, then the device sends a status request message to the neighbour device. The status request message is a unicast control message 312, specifying the status operation 338 and the request option 346. At block 386, the device determines if a reply or any other message has been received, originating from the neighbour device, within another given time period. The other given time period, for example, starts from when the status request message was sent. If, at block 388, a message is received from the neighbourhood device, then no action is taken (block 388). However, if not, then the device deletes the neighbourhood device from the neighbourhood list (block 390).

Figure 16:
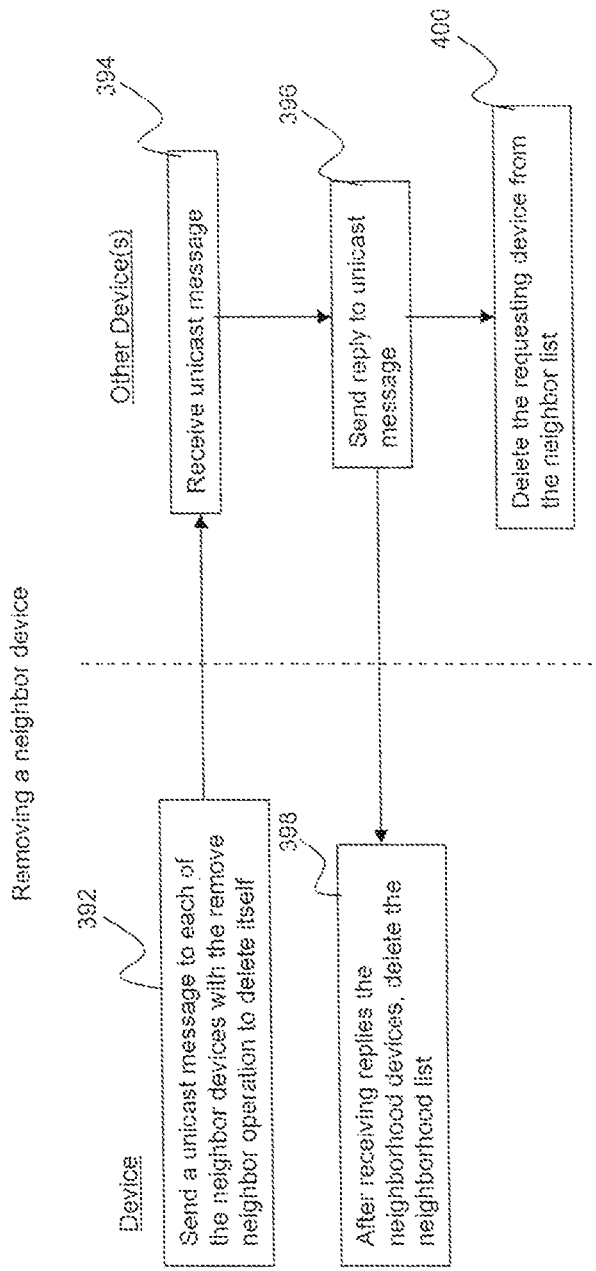
FIG. 16 is a flow diagram of example embodiment computer executable or processor implemented instructions for removing a neighbour device.

Turning to FIG. 16, an example embodiment of computer executable or processor implemented instructions are provided for a device requesting itself to be removed from an overlay network. At block 392, a requesting device sends unicast message to the neighbour devices with the remove neighbour operation 336 specified. At block 394, the other devices in the overlay network delete the unicast message. At block 396, the other devices individually send a reply unicast message. The reply unicast message has the same information as the request unicast message, however, the options instead specify a request 346. At block 398, after the requesting device receives the replies from the neighbourhood devices, it deletes the neighbourhood list. The requesting device may still keep the tree data, or it may delete the tree data. At block 400, the other devices delete the requesting device from the neighbour list.

In an example embodiment, a user who has a desktop computer, a tablet and a mobile device may have bookmarks currently synchronized in an overlay network according to the distributed tree protocol described herein. However, the user would like to remove the tablet from the overlay network of bookmarks. The tablet, a physical node in the overlay network, uses the above process to communicate with the desktop computer and the mobile device to remove itself from the overlay network. Although removed from the network, the tablet continues to keep the bookmark data stored on the tablet.

Figure 17:
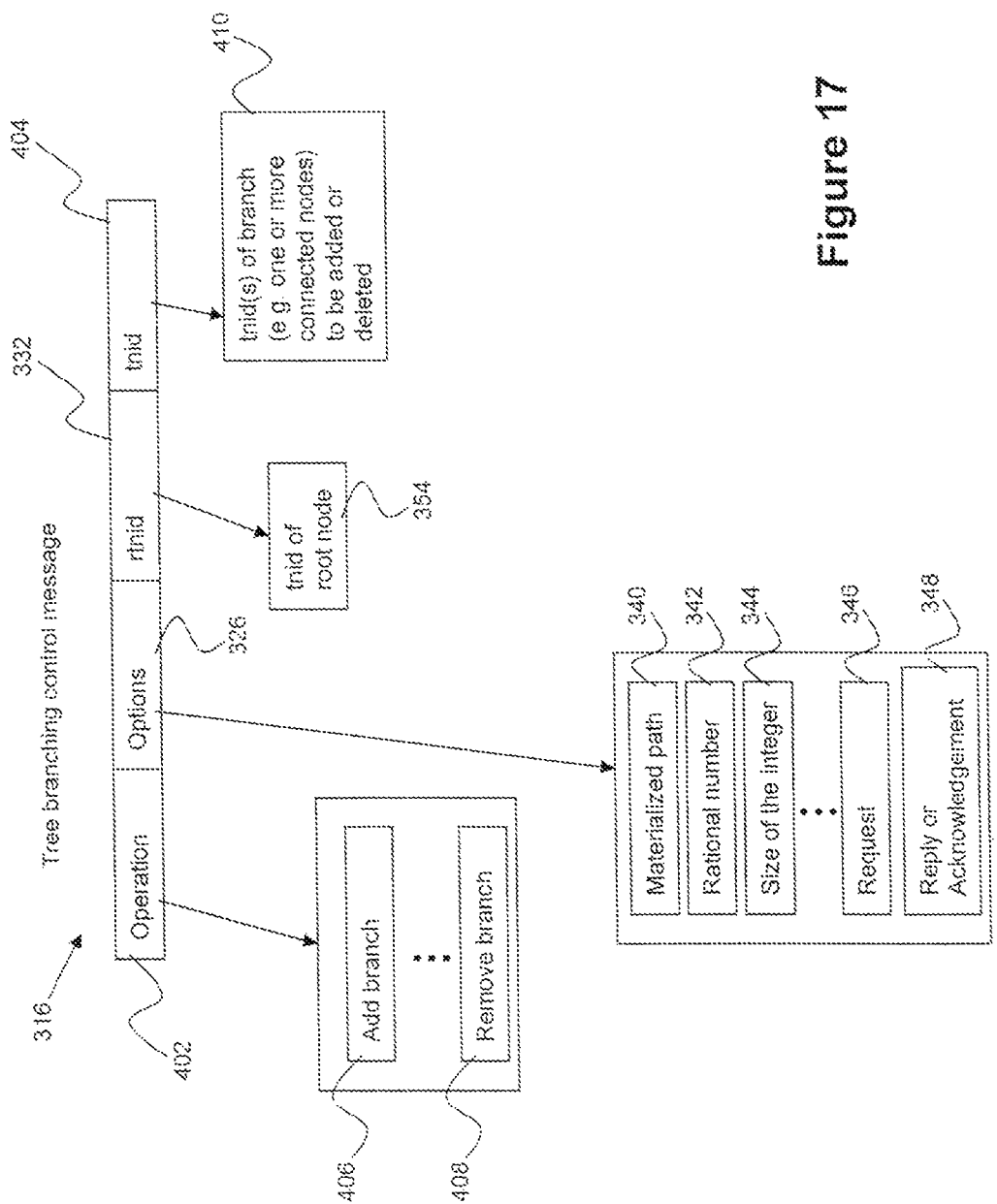
FIG. 17 is a block diagram illustrating an example embodiment of a tree branching control message.

Turning to FIG. 17, example components of a tree branching control message 316 are provided. The component fields include: an operation field 402, an options field 326, a rtnid field 332, and a tnid field 404.

The operation field 402 includes an add branch operation 406 and a remove branch operation 408. A branch of a tree is considered a collection of nodes that are children, grandchildren, great grandchildren. etc. of an internal node. The branch, in some example embodiments, includes the internal node.

An entire branch can be added or deleted using the tree branching control message 316. If a first device sends such a message 316 with the add branch operation 406 (with a request option 346) to a second device, then the first device is requesting the second device to add a defined branch to the tree (identified by rtnid). If a first device sends a message 326 with the remove branch operation 408 (with a request option 346) to a second device, then the first device is requesting the second device to remove a defined branch from the tree (identified by rtnid).

In an example embodiment, the branch itself is identified by the tnid of the internal node 410. All of the internal node's children, grandchildren, great grandchildren, etc. will be added or deleted. In another example embodiment, the tnid field 404 specifies one or more tnids of connected nodes defining a branch to be added or deleted. For example, if there are multiple nodes defining a branch, multiple tnids (or tree node IDs) will be included in the tnid field 404.

In an example embodiment, a computing device detects an addition of least one new node on the tree structure on the computing device. For example, a user has just added a new bookmark to a bookmarks list, or added a new contact to a contact list. The computing device sends a tree data control message to a neighbour computing device. The operation value 406 is used to specify adding the at least one new tree node, such as a tree branch, to the tree structure. The message would also include the tree node ID or tree node IDs identifying the node(s) to be added to the tree structure in the neighbour computing device. The message would also include a request indicator.

Figure 18:
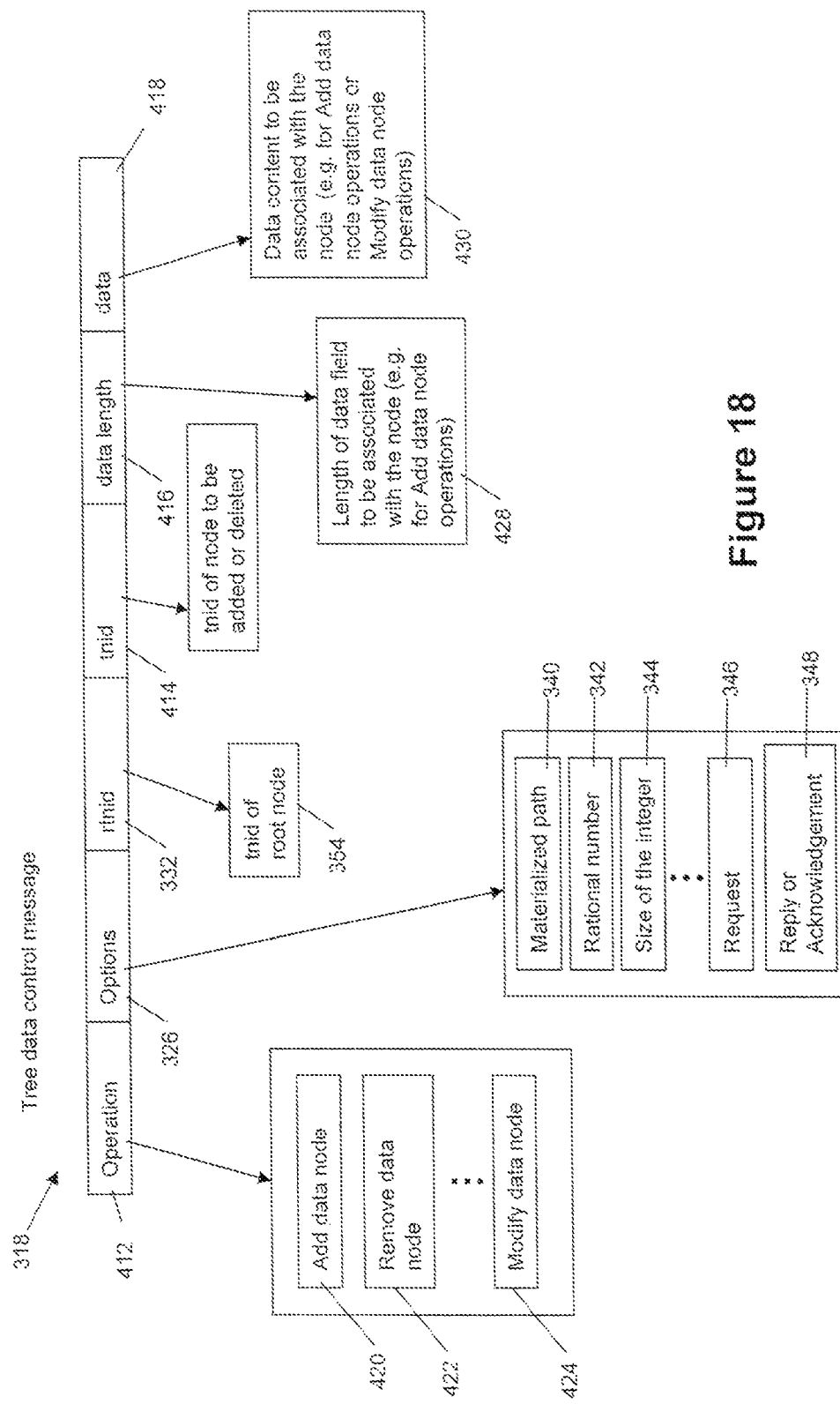
FIG. 18 is a block diagram illustrating an example embodiment of a tree data control message.

Turning to FIG. 18, an example embodiment of a tree data control message is shown. It includes the following component fields: an operation field 412, an options field 326, a rtnid field 332, a tnid field 414, a data length field 416, and a data field 418.

The operation field 412 specifies the type of operation to be performed. It can include, for example, adding a data node 420, removing a data node 422, and modifying a data node 424. In an example embodiment, if a first device sends a request message 318 specifying the operation 420 to a second device, then the first device is requesting the second device to add a data node to the second device's copy of the tree. In another example embodiment, if a first device sends a request message 318 specifying the operation 422 to a second device, then the first device is requesting the second device to remove a data node from the second device's copy of the tree. In another example embodiment, if a first device sends a request message 318 specifying the operation 424 to a second device, then the first device is requesting the second device to modify a data node on the second device's copy of the tree.

The tnid field 414 is populated with the tnid of the node to be added or deleted 426. The data length field 416 is populated with the length of the data field associated with the node 428. In an example embodiment, this information is only used when adding a data node. The data field 418 includes the data content to be associated with the node 430. In an example embodiment, this information is only used in add data operations or modify data operations.

For example, there may be three computing devices which have their media play list synchronized using the data tree protocol described herein. If a user adds a new song file to a play list on one of the devices, then this particular computing device automatically sends out a tree data control message 318 (e.g. specifying an add data node operation 420, the format of the tnids, the request option 346, rtnid of the tree structure of the play list, the tnid of the node to be added, the data length of the song file information, and the song file information itself) to the other two devices. The other two devices would then use this information to add the new node, containing the new song file, to the data tree structure. In this way, the other two devices' play lists are updated to include the new song file. In an example embodiment, the other two devices send a tree data control message 318 having the similar information, however specifying the reply or acknowledgement option 348.

More generally, a computing device receives a message request from another computing device, which has an operation value specifying adding at least one new tree node to the tree structure. The at least one tree node ID is a new tree node ID of the at least one new node, and the message includes the request indicator. In response, the computing device adds the at least one new tree node to a certain location in the tree structure. The certain location is conveniently identified by the new tree node ID. The computing device then sends another message to the other device. The other message includes the operation value specifying adding the at least one new tree node to the tree structure, the new tree node ID, the root node ID, the format value, and the reply indicator.

Figure 19:
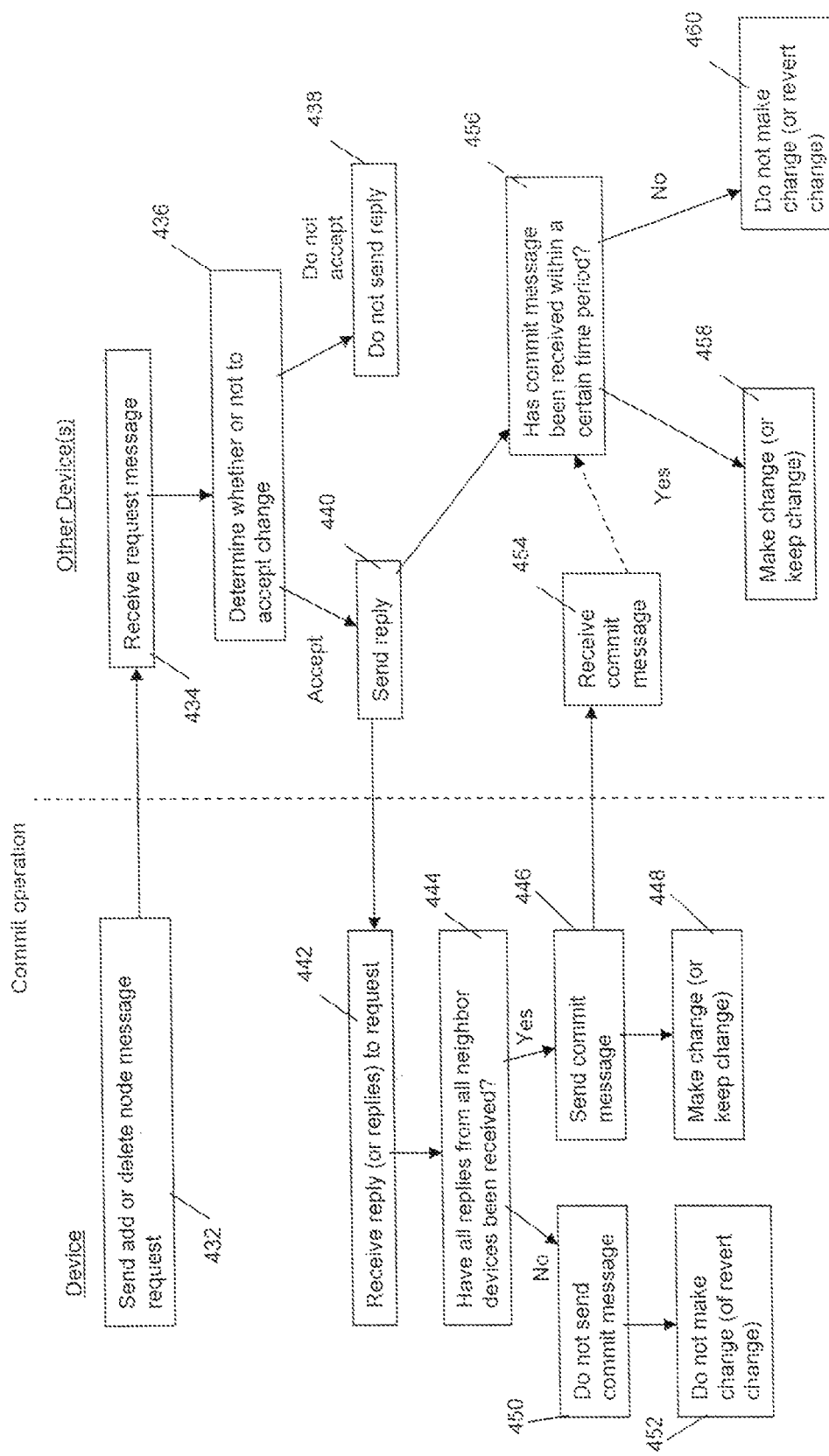
FIG. 19 is a flow diagram of example embodiment computer executable or processor implemented instructions for using a commit message.

Turning to FIG. 19, an example embodiment of computer executable or processor implemented instructions are provided for using a commit message 320. A commit message 320 is used to confirm that other devices in the overlay network acknowledge an operation to add or delete a node, or add or delete a branch. In an example embodiment, if all devices do not send a commit message reply to the device that would like to make the change to the tree, then that device reverts the change or does not make the change.

Referring to block 432 of FIG. 19, a requesting device sends an add or delete node message request to the other device or devices in the overlay network for a particular tree. Each of the other devices determine whether or not to accept the change. If a given other device does not accept the change, then it does not send a reply (block 438). If a given device does accept the change, it sends a reply to the requesting device (block 440). It can be appreciated that is possible for some devices in the overlay network to accept the change, while other devices do not accept the change and thus, do not send a reply. In an example embodiment, there may be a default setting that specifies each physical node, or device, in an overlay network is to automatically accept changes requested by a neighbour device.

At block 442, the requesting device receives a reply, or replies, if any, to the request. At block 444, the requesting device determines if replies from all of the neighbour devices in the overlay network have been received. If not, then the requesting device does not send a commit message (block 450). If the requesting device already made the change to its own copy of the tree, then it reverts the change. If the requesting device has received replies from all neighbour devices, then it sends a commit message to the neighbour devices (block 446). If the requesting device has already made the requested change, then it keep the change (block 448). If no change has yet been made, it makes the requested change to the tree.

If a neighbour device sends a reply, as per block 440, it then determines if a commit message has been received within a certain time period since sending the reply. If the neighbour device does receives a commit message within the certain time period (block 454), then it makes the requested change to its own copy of the tree. If it already has made the change, then it keeps the change (block 458). However, if the neighbour device does not receive a commit message within a certain time period, the neighbour device does not make the requested change (block 460). Or, if the neighbour device has already made the change when accepting the change, it reverts the change.

It can be appreciated that the above process requires an approval from all devices in the overlay network before committing to a change.

Turning to FIG. 20, an example embodiment of a token 322 is shown. It is used to control which device in the overlay network is able to make a change to the tree, whereby that change can be distributed throughout other copies of the tree located on other devices in the network. The token 322 includes a token ID 462 which identifies the token. In an example embodiment, the token ID is an unsigned integer and is created sequentially. For example, the first version of the token has an ID of "1", and a second version of the token has an ID of "2". The token also includes the rtnid 464, identifying the associated tree. It also includes a neighbour list 466 and a time stamp 468 identifying the time and date that the token was created.

Turning to FIG. 21, an example embodiment of computer executable or processor implemented instructions are provided for several devices to transmit a token throughout an overlay network. It can be appreciated that only one device in an overlay network may have the corresponding token at any given time. As described earlier, the device that has the token is able to make or request changes to the data tree.

Referring to FIG. 21, Device 1 has the token (block 470). It sends the token to Device 2 (block 472). Device 2 receives the token (block 474). Device 2 determines if use of the token is required (block 476). For example, if a user has made a change to the data tree structure using Device 2, and it is to be distributed, then Device 2 requires the token to distribute the change to the other devices. If the use of the token is required, after receipt of the same, it is used (block 478). Device 2 then sends the token to another device on the neighbour list, such as Device N. If Device 2 did not need to use the token, it automatically sends the token to another device on the neighbour list (block 480). In an example embodiment, even if Device 2 does not need to use the token, it waits for a predetermined amount of time (e.g. a few seconds), before sending the token. In this way, frequency of sending the token is reduced, along with bandwidth usage.

Continuing with FIG. 21, Device N receives the token (block 482). It determines if use of the token is required or not (block 484). If so, it uses the token (block 486), before sending to Device 1 (block 488). If not, Device N sends the token to Device 1 (block 488), and optionally waits for a delayed amount of time before sending the token.

At block 490. Device 1 receives the token. It determines if use of the token is required (block 492). If so, it uses the token (block 494), before sending the token to Device 2 (block 472). If not, Device 1 sends the token to Device 2 (block 472), and optionally inserts a time delay before doing so.

In this way, all the devices in an overlay network can have access to the token and use the token to request or make changes to the tree, if need be.

In an example embodiment, the device detects a modification to the tree structure. For example, the device receives a user input to add data or remove data. If so, the device then determines if it possesses a token. If it possesses the token, it sends a message including a request indicator to make the modification. In other words, since it posses the token, other devices are "locked" and cannot make or request changes. However, if the device does not possess the token, it waits to receive the token before sending the message including the request indicator. In other words, if it does not possess the token, the device is locked out from making changes, and after it receives the token, it's ability to make changes is considered "unlocked".

In an example embodiment, if a device, which has possession of a token, is not able to be reached by other devices in the same overlay network, then the other device are not able to make changes to the data tree structure. The device possessing the token may, for example, fail, be turned off, or suddenly lose communication abilities. Such a non-communication state can be identified by the other devices in the overlay network sending status request messages to the device possessing the token. If no reply is received within a certain time period, for example according to the operations described in FIG. 15, then the device possessing the token is removed from the overlay network and the neighbour list. The token in possession by the removed device is also removed from the overlay network. A new version of the token is created to take its place.

In another example embodiment, it may be desirable to join two data trees together. For example, one user may have a computing device containing bookmarks, and another uses may have another computing device containing other bookmarks. The users would like to synchronize their bookmarks together using the distributed tree protocol. However, each of the two bookmark lists, represented as two trees, have their own token. A new token is created which reflects the new root node ID of the new tree, and it includes an updated neighbour list identifying all the devices associated with both of the old tokens.

In an example embodiment, if a device is removed from an overlay network, and then re-joins the network, the re-joined device undergoes a re-synchronization process. Regarding re-synchronization of a tree, after a device is reconnected to its neighbour device, it synchronizes its current tree with the tree in its neighbour device. An example embodiment of a requirement associated with this process is, if two devices share the same tree, their respective copies of the tree should be identical if neither one of them is in possession of the token.

In another example embodiment, the changes to a tree are recorded and stored in a log of operations. In an example embodiment, the logs are stored in association with the tokens, and become incorporated into newer versions of token that are created during a certain lifetime of the tree. For two devices to synchronize, the device with the older tree and/or with the largest token ID (e.g. which indicates the token was most recently created) could simply have its tree overriding the other device's tree. Another way is to process the recorded operations stored in the logs, and ensure those operations are performed on the trees of both devices, so that both devices have, as a result, identical copies of a tree.

Storing in the log database all the tokens created and also the operations done during a certain lifetime of the tree. This is more complex, however, with better synchronization results. As the logs in both devices contains the operations and the tokens created, both logs can be combined to generated another log set that when executed can produce a synchronized tree that reflects better the separate evolution of the unsynchronized trees.

In another example embodiment, a standard synchronization protocol called SyncML, can be used in combination with the distributed tree protocol described herein.

In another example embodiment, the distributed tree protocol described herein can be used with Persistent Publish/Subscribe (PPS) systems in QNX™ devices. The QNX PPS service is a small, extensible publish/subscribe service that offers persistence across reboots. It is designed to provide a simple and easy to use solution for both publish/subscribe and persistence in embedded systems, answering a need for building loosely connected systems using asynchronous publications and notifications. With PPS, publishing is asynchronous: the subscriber need not be waiting for the publisher. In fact, the publisher and subscriber rarely know each other. In an example embodiment, their connection is an object which has a meaning and purpose for both publisher and subscriber.

For example, a PPS object file with tree nodes resembles the following:
@filename
attrib1::3
n1.n2.n3::4

"attrib1" is considered a normal PPS attribute name. "n1.n2.n3" is an extended attribute name representing a tree node ID (or tnid) in a materialized path format. In another example embodiment, the tnid is in a rational number format. In another example embodiment, PPS publishers support the distributed tree protocol, and PPS subscribers do not need to support the distributed tree protocol. PPS subscribers will not alter or modify the tree, and only read the tree according to read/write functions. In an example embodiment, the publishers alter the tree and therefore need to participate in lock/unlock mechanisms provided by the distributed tree protocol, described herein. The locking and unlocking mechanisms are defined by possession of the token. Publishers can be considered a man-in-the-middle, making sure that the date in the PPS files, which are distributed in several devices around the network, are synchronized.

In an example embodiment, a method performed by a computing device for modifying data, is provided. It includes: representing data in a tree structure, the tree structure including at least one tree node identified by a tree node ID, the tree node ID including a numerical value representing a path from a root node to the at least one node, the root node and the tree structure identified by a root node ID; and at least one of sending and receiving a peer-to-peer message with an other computing device, the message including a format value specifying a format of the numerical value, the root node ID, an operation value specifying modification of the data, and at least one tree node ID associated with the modification of the data.

In an example embodiment, the format of the numerical value is a materialized path. In another example embodiment, the format of the numerical value is a rational number of a form a/b, where a>b>1 and GCD (a,b)=1. In another example embodiment, the root node ID is an unsigned integer. In another example embodiment, a neighbour list is stored in association with the tree structure, the neighbour list including an identity of at least the other computing device, and the computing device forms a peer-to-peer overlay network specific to the tree structure with at least the other computing device. In another example embodiment, the message includes a request indicator or a reply indicator. In another example embodiment, the method further includes: detecting an addition of least one new node on the tree structure on the computing device; and sending the message to the other computing device, wherein the operation value specifies adding the at least one new tree node to the tree structure, the at least one tree node ID is a new tree node ID of the at least one new node, and the message includes the request indicator. In another example embodiment, the computing device receives the message from the other computing device, the operation value specifies adding at least one new tree node to the tree structure, the at least one tree node ID is a new tree node ID of the at least one new node, and the message includes the request indicator; and, the method further including adding the at least one new tree node to a certain location in the tree structure, the certain location identified by the new tree node ID. In another example embodiment, the method further includes the computing device sending an other message to the other device, the other message including the operation value specifying adding the at least one new tree node to the tree structure, the new tree node ID, the root node ID, the format value, and the reply indicator. In another example embodiment, the method further includes: detecting a deletion of at least one node on the tree structure on the computing device; and sending the message to the other computing device, wherein the operation value specifies deleting the at least one deleted tree node from the tree structure, the at least one tree node ID is of the deleted tree node, and the message includes the request indicator. In another example embodiment, the computing device receives the message from the other computing device, the operation value specifies deleting at least one tree node from the tree structure, the at least one tree node ID is of the at least one tree node to be delete, and the message includes the request indicator; and, the method further including deleting the at least one tree node to be deleted from a certain location in the tree structure, the certain location identified by the at least one tree node ID. In another example embodiment, the method further includes: the computing device sending an other message to the other device, the other message including the operation value specifying deleting the at least one tree node from the tree structure, the at least one tree node ID, the root node ID, the format value, and the reply indicator. In another example embodiment, the method further includes the computing device detecting a modification to the tree structure, determining if it possesses a token, and if so, sending the message including the request indicator. In another example embodiment, if the computing device does not possess the token, waiting to receive the token before sending the message including the request indicator. In another example embodiment, the token includes a neighbour list, the neighbour list including an identity of at feast the other computing device, and the computing device forms a peer-to-peer overlay network specific to the tree structure with at least the other computing device, and the method further including the computing device at least one of receiving and sending the token from and to, respectively, the other computing device.

In another example embodiment, a method performed by a computing device to modify a peer-to-peer network, is provided. It includes: representing data in a tree structure, the tree structure including at least one tree node identified by a tree node ID, the tree node ID including a numerical value representing a path from a root node to the at least one node, the root node and the tree structure identified by a root node ID; and at least one of sending and receiving a peer-to-peer message with an other computing device, the message including a format value specifying a format of the numerical value, the root node ID, an operation value specifying modification of the peer-to-peer network, and a communication address of the computing device or the other computing device.

In another example embodiment, the message is a unicast message, and the method further includes: the computing device receiving a multicast message from the other computing device, the multicast message specifying a neighbour request, the request indicator, the communication address of the computing device, and the root node ID; and the computing device generating and sending the unicast message to the other computing device, wherein the operation value specifies adding a neighbour to the peer-to-peer network, and the unicast message includes a request indicator. In another example embodiment, the method further includes: receiving a unicast message reply from the other device, and adding an identity and a communication address of the other device to a neighbour list to form a peer-to-peer overlay network specific to the tree structure with at least the other computing device. In another example embodiment, the message is a unicast message, and the method further includes: the computing device sending the multicast message to the other computing device, wherein the operation value specifies removing itself from the overlay network; and after receiving a reply from the other device, deleting a neighbour list which includes an identity and the communication address of the other computing device.

In another example embodiment, a computing device is configured to synchronize data with at least one other computing device. The computing device is configured to be in peer-to-peer communication with the at least one other computing device. The computing device includes: data represented in a tree structure, the tree structure including at least one tree node identified by a tree node ID, the tree node ID including a numerical value representing a path from a root node to the at least one node, the root node and the tree structure identified by a root node ID; and computer executable instructions to read or write a peer-to-peer message configured to be sent to the other computing device, the message including an operation field to add or remove a given node in the tree structure, an options field specifying characteristics of the message, the root node ID, and a given tree node ID of the given tree node.

The steps or operations in the flow charts described herein are just for example. There may be many variations to these steps or operations without departing from the spirit of the invention or inventions. For instance, the steps may be performed in a differing order, or steps may be added, deleted, or modified.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method performed by a computing device for modifying data, comprising:
  representing data in the computing device as a tree structure, the tree structure including at least one tree node representing a portion of the data and identified by a tree node ID, the tree node ID including a numerical value representing a path from a root node to the at least one node, the root node and the tree structure identified by a root node ID;
  responsive to detecting a modification to the tree structure at the computing device, determining if the computing device possesses a token required to synchronize the modification with an other computing device comprising a copy of the tree structure, the token comprising a neighbour list associated with the tree structure, the neighbour list comprising identities of multiple computing devices, including the computing device and the other computing device, the multiple computing devices forming a peer-to-peer overlay network specific to the tree structure to synchronize the data amongst the multiple computing devices, and only one of the multiple computing devices has the token at any given time; and
  responsive to determining the computing device possess the token, sending a peer-to-peer message to the other computing device, the message including a format value specifying a format of the numerical value, the root node ID, an operation value specifying modification of the data, and at least one tree node ID associated with the modification of the data.

2. The method of claim 1 wherein the format of the numerical value is a rational number of a form a/b, where a≥b≥1 and GCD (a,b)=1.

3. The method of claim 1 wherein the root node ID is an unsigned integer.

4. The method of claim 1 wherein the tree structure and the overlay network are specific to an application and the computing device is part of different overlay networks associated with different applications.

5. The method of claim 1 wherein the message comprises a time period and, after detecting no reply from the other computing device within the time period, removing the other computing device from the neighbour list.

6. The method of claim 1 further comprising:
  detecting an addition of least one new node on the tree structure on the computing device; and
  sending the message to the other computing device, wherein the operation value specifies adding the at least one new tree node to the tree structure, the at least one tree node ID is a new tree node ID of the at least one new node, and the message includes a request indicator.

7. The method of claim 1 further comprising the computing device receiving another message from the other computing device, the other message including an operation value that specifies adding at least one new tree node to the tree structure, a new tree node ID of the at least one new node, and a request indicator; and,
  the method further comprising adding the at least one new tree node to a certain location in the tree structure, the certain location identified by the new tree node ID.

8. The method of claim 7 further comprising the computing device sending a reply message to the other device, the reply message including the operation value specifying adding the at least one new tree node to the tree structure, the new tree node ID, the root node ID, the format value, and a reply indicator.

9. The method of claim 1 further comprising:
  detecting a deletion of at least one node on the tree structure on the computing device; and
  sending the message to the other computing device, wherein the operation value specifies deleting the at least one deleted tree node from the tree structure, the at least one tree node ID is of the deleted tree node, and the message includes a request indicator.

10. The method of claim 1 further comprising the computing device receiving another message from the other computing device, the other message including an operation value that specifies deleting at least one tree node from the tree structure, a tree node ID of the at least one tree node to be deleted, and a request indicator; and,
  the method further comprising deleting the at least one tree node to be deleted from a certain location in the tree structure, the certain location identified by the at least one tree node ID.

11. The method of claim 10 further comprising the computing device sending a reply message to the other device, the reply message including the operation value specifying deleting the at least one tree node from the tree structure, the tree node ID of the at least one tree node to be deleted, the root node ID, the format value, and a reply indicator.

12. The method of claim 1 further comprising, after the computing device receives the token and determines use of the token is not required, the computing device sending the token to another one of the multiple devices.

13. The method of claim 12 wherein the computing device waits for a predetermined amount of time before sending the token.

14. The method of claim 1 wherein if the computing device does not possess the token, waiting to receive the token before sending the message.

15. A computing device configured to synchronize data with at least one other computing device, the computing device comprising:
- a communication subsystem configured to facilitate peer-to-peer communication with the at least one other computing device;
- memory configured to store data represented as a tree structure, the tree structure including at least one tree node representing a portion of the data and identified by a tree node ID, the tree node ID including a numerical value representing a path from a root node to the at least one node, the root node and the tree structure identified by a root node ID; and,
- a processor configured to execute computer executable instructions, the computer executable instructions comprising:
- responsive to detecting a modification to the tree structure at the computing device, determining if the computing device possesses a token required to synchronize the modification with an other computing device comprising a copy of the tree structure, the token comprising a neighbour list associated with the tree structure, the neighbour list comprising identities of multiple computing devices, including the computing device and the other computing device, the multiple computing devices forming a peer-to-peer overlay network specific to the tree structure to synchronize the data amongst the multiple computing devices, and only one of the multiple computing devices has the token at any given time; and
- responsive to determining the computing device possess the token, toreador write a peer-to-peer message configured to be sent to the other computing device, the message including an operation field to add or remove a given node in the tree structure, an options field specifying characteristics of the message, the root node ID, and a given tree node ID of the given tree node.

16. A non-transitory computer readable medium comprising instructions for modifying data, the instructions executable by a computing device and the instructions comprising:
- representing data in the computing device as a tree structure, the tree structure including at least one tree node representing a portion of the data and identified by a tree node ID, the tree node ID including a numerical value representing a path from a root node to the at least one node, the root node and the tree structure identified by a root node ID;
- responsive to detecting a modification to the tree structure at the computing device, determining if the computing device possesses a token required to synchronize the modification with an other computing device comprising a copy of the tree structure, the token comprising a neighbour list associated with the tree structure, the neighbour list comprising identities of multiple computing devices, including the computing device and the other computing device, the multiple computing devices forming a peer-to-peer overlay network specific to the tree structure to synchronize the data amongst the multiple computing devices, and only one of the multiple computing devices has the token at any given time; and
- responsive to determining the computing device possess the token, sending a peer-to-peer message to the other computing device, the message including a format value specifying a format of the numerical value, the root node ID, an operation value specifying modification of the data, and at least one tree node ID associated with the modification of the data.

* * * * *